US012534957B2

United States Patent
Di Trapani et al.

(10) Patent No.: US 12,534,957 B2
(45) Date of Patent: Jan. 27, 2026

(54) CHROMATIC SUNSHADE CLADDING UNIT

(71) Applicant: CoeLux S.r.l., Lomazzo (IT)

(72) Inventors: Paolo Di Trapani, Cavallasca (IT);
Simone Bonanomi, Muggiò (IT);
Sandro Usseglio Nanot, Giaveno (IT);
Paolo Brazzo, Milan (IT); Vittorio Fossati, Varese (IT)

(73) Assignee: CoeLux S.r.l., Lomazzo (IT)

(*) Notice: Subject to any disclaimer, the term of this patent is extended or adjusted under 35 U.S.C. 154(b) by 394 days.

(21) Appl. No.: 18/249,438

(22) PCT Filed: Oct. 20, 2021

(86) PCT No.: PCT/IB2021/059673
§ 371 (c)(1),
(2) Date: Apr. 18, 2023

(87) PCT Pub. No.: WO2022/084883
PCT Pub. Date: Apr. 28, 2022

(65) Prior Publication Data
US 2023/0383596 A1 Nov. 30, 2023

(30) Foreign Application Priority Data
Oct. 21, 2020 (IT) .................. 102020000024841

(51) Int. Cl.
*E06B 9/386* (2006.01)
*G02B 1/00* (2006.01)
(Continued)

(52) U.S. Cl.
CPC ............. *E06B 9/386* (2013.01); *G02B 1/002* (2013.01); *G02B 5/0247* (2013.01); *E06B 2009/2417* (2013.01)

(58) Field of Classification Search
CPC ............ E06B 9/386; E06B 2009/2417; E06B 2009/2464; E06B 9/24; G02B 1/002;
(Continued)

(56) References Cited

U.S. PATENT DOCUMENTS

2016/0060954 A1 3/2016 Nishida

FOREIGN PATENT DOCUMENTS

EP 2787377 A1 10/2014
WO 2017008821 A1 1/2017

OTHER PUBLICATIONS

International Search Report and Written Opinion of the European Patent Office, international application PCT/IB2021/059673, mailed Feb. 2, 2022, 9 pages total.
(Continued)

*Primary Examiner* — Abe Massad
(74) *Attorney, Agent, or Firm* — DiBerardino McGovern IP Group LLC

(57) ABSTRACT

A sunshade cladding unit includes a plurality of lamellae each having a substantially flat and elongated conformation along a respective development axis, and a structure supporting the lamellae in a condition of parallel and spaced apart lamellae along a direction orthogonal to the development axes. The structure supports the lamellae in a rotatable manner about a rotation axis parallel to or coincident with its development axis. Each lamella includes at least one surface portion that includes at least a reflective layer having at least one reflective surface, and a chromatic diffusion layer having a first surface proximal to the reflective surface and a second surface, opposite and substantially parallel to the first. The chromatic diffusion layer includes a nano-pillar or nano-pore structure in a first material having a first refractive index, immersed in a second material having a second refractive index other than the first refractive index.

21 Claims, 21 Drawing Sheets

(51) Int. Cl.
*G02B 5/02* (2006.01)
*E06B 9/24* (2006.01)

(58) Field of Classification Search
CPC .. G02B 5/0247; G02B 5/0215; G02B 5/0284; G02B 5/26; F21V 7/05; F21V 11/04; G02F 1/1334; G02F 2202/36
See application file for complete search history.

(56) References Cited

OTHER PUBLICATIONS

Standard Terminology of Appearance, Designation E284-09a, ASTM International, Feb. 10, 2012, 23 pages total.
Runge, Jude Mary, "The Metallurgy of Anodizing Aluminum Connecting Science to Practice", Feb. 2018, Springer International Publishing, Chapter 3, pp. 149-190.

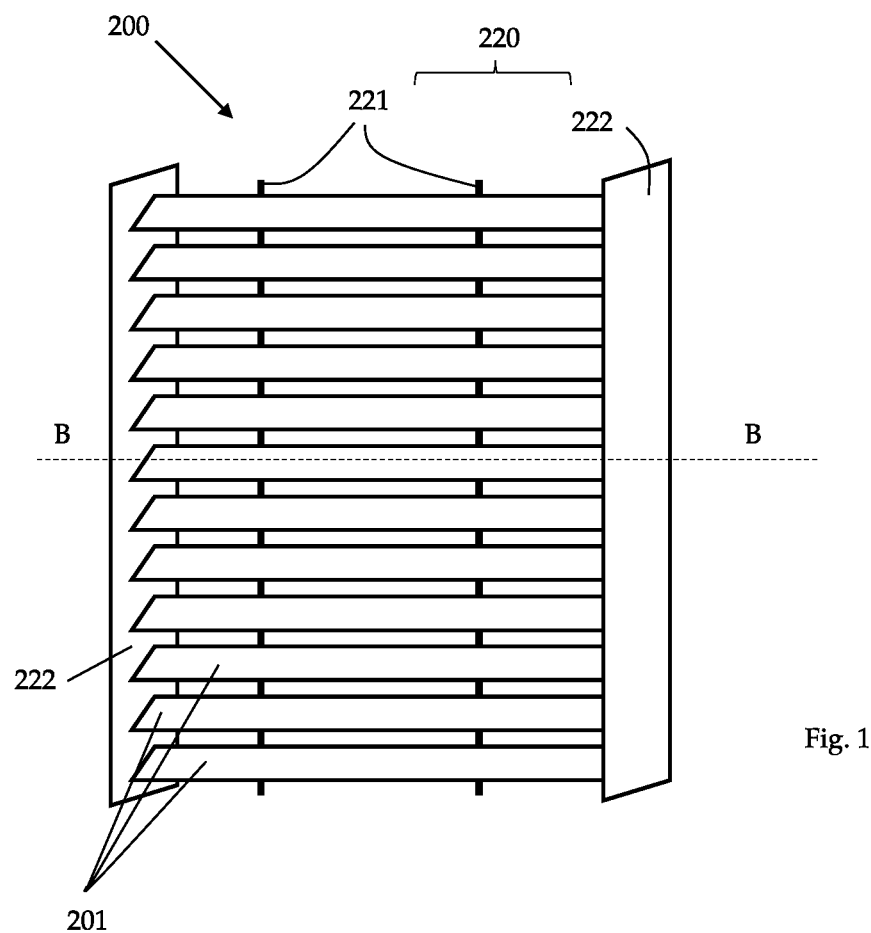
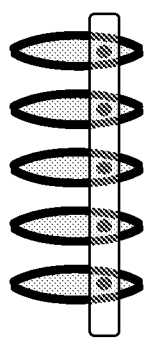
Fig. 1a
Fig. 1b
Fig. 1

CHROMATIC SUNSHADE CLADDING UNIT

TECHNICAL FIELD

The present invention relates in general terms to sunshade units for the internal or external cladding of the transparent structures of a building façade, such as for example windows and glazings, as well as for the external cladding of the opaque structures of a façade. In particular, the present invention relates to sunshade units with chromatic effect, i.e., capable of interacting with an incident light in such a way as to generate chromatic effects in the reflected light and thus offer the observer a particular visual perception thereof.

BACKGROUND

Sunshade cladding units are typically used inside a building, at the transparent structures of the façades such as windows or glazings, to reduce the entry of light from the outside, or outside a building, to protect the transparent structures and/or the opaque structures of the façades of buildings from direct solar radiation or simply to give them a different aesthetic appearance. In general terms, the sunshade cladding units comprise a lamella or slat structure, in which the lamellae are arranged parallel to each other and spaced apart in a direction orthogonal to the direction of development of the lamellae, and are maintained in this parallel and spaced apart arrangement by one or more support elements arranged transversely to the lamellae, such as vertical uprights, in the case of sunshade units for outdoors, or suspension ties, in the case of sunshade units for indoors.

In the sunshade cladding units intended for internal cladding—also known as Venetian sunshade units—or for external cladding of transparent structures of the façade, the connection between the lamellae and the uprights is generally of the movable type so as to allow the lamellae to rotate around their own axis. This allows an adjustment of the inclination of the lamellae with respect to the uprights, which can therefore be modified according to the contingent weather conditions. For example, in the event of excessive light and beating sun, the sunshade units of the movable type allow the lamellae to be inclined so as to assume a conformation substantially parallel to the wall, thus increasing the shielding action offered by the unit, while in the case of cloudy days, it is preferable to arrange the lamellae at right angles to the wall, to allow a greater portion of light to enter. On the other hand, the sunshade cladding units intended for the external cladding of the opaque structures of the façades are usually made with a fixed and non-modifiable orientation between the lamellae and the uprights.

Another type of known sunshade cladding units, particularly suitable for cladding the transparent portions of the façades, comprises a lamella structure housed between a pair of thin panels that are transparent to visible light, and which are bound to a support structure, such as a frame, in such a way as to be kept rigidly parallel and mutually spaced apart. The lamella structure is therefore housed, generally in a suspended configuration, in the interspace between the two panels. These special sunshade cladding units are usually used to overlap or replace the transparent structures of the façades.

The known sunshade cladding units, while offering an excellent result in terms of shielding and shading with respect to the sunlight incident on the façades, are not usually able to offer particular chromatic effects, nor with reference to the appearance of the building seen from the outside nor with regard to light reflected inside the buildings.

However, it is well known that there is an increasing need to clad buildings in such a way as to give them a particular chromatic effect. By way of example, reference is made to Patent Application No. PCT/EP2015/001454 by the same Applicant relating to cladding units for façades. These units comprise a support structure and a chromatic reflective layer formed on the support structure, where the chromatic reflective layer includes at least one layer of material loaded with nanoparticles that covers the reflective surface in such a way as to interact with the incident light, reproducing the typical chromatic characteristics of the sky and of the sun. In particular, the interaction of the incident light with the material loaded with nanoparticles leads to a reflective behaviour that varies as a function of the wavelength, presenting a regular spectral reflectance (hereinafter simply regular reflectance) that is greater in red than in blue and, vice versa, a diffuse spectral reflectance (hereinafter simply diffuse reflectance) that is higher in blue than in red. Within the scope of this description and the subsequent claims, the terms "regular reflectance" and "diffuse reflectance" refer to the definitions provided in the E284 standard for terminology describing the appearance of materials and light sources. Furthermore, the term "spectral" refers to the regular reflectance and diffuse reflectance evaluated as a function of the wavelengths of light.

This reflective behaviour, and in particular the dependence of the regular and diffuse reflection of the wavelength of the incident light, generates a bluish colouring of the illuminated panel, observed outside the regularly reflected beam of light. This bluish colouring is given to the panel by the light reflected diffusedly, or subsequently simply diffused. In contrast, the regularly reflected light is characterized by a correlated colour temperature (CCT) lower than the CCT of incident light, as regular reflectance is greater for wavelengths in the red than for wavelengths in the blue region.

Specifically, the Applicant has characterized the aesthetic effect obtained by means of the reflective units described in International Application No. PCT/EP2015/001454, finding that this effect is characterized by:

a regularly reflected beam having chromatic coordinates comprised in a region of the colour plane CIE 1976 u'-v' with coordinates u'>0.210 and v'>0.470 and a maximum Cartesian distance in this colour plane less than 0.1 from the Planck curve referred to the light source which illuminates the reflective unit, where such light source is a standard illuminator CIE E; and a diffused reflected beam having chromatic coordinates comprised in a region of the colour plane with coordinates u'<0.210 and v'<0.430.

In the case of sunshade cladding units, the use of a chromatic reflective layer of the type such as the one described in International Application no. PCT/EP2015/001454 is particularly complex since, in order to obtain a good aesthetic result and to preserve the uniformity of appearance of the sunshade unit when illuminated, it is necessary to have a high degree of thickness uniformity between the nanoparticle-loaded cladding layers of each lamella. A non-uniformity, for example, in the thickness of the cladding layer results in a non-homogeneous colouring of the sunshade unit when illuminated. However, the deposition of strictly uniform layers requires the use of expensive techniques, mostly resulting in a high percentage of waste.

The Applicant has therefore strongly perceived the need to realise a sunshade cladding unit which is on the one hand capable of offering a uniform chromatic effect, and on the other hand, which can be realised by means of simple and inexpensive techniques. In particular, the Applicant has identified the need to realise sunshade cladding units capable of guaranteeing a homogeneous chromatic effect.

SUMMARY OF THE INVENTION

In a first aspect, the present invention is directed to a sunshade cladding unit. The unit comprises a plurality of lamellae each having a substantially flat and elongated conformation along a respective development axis B, and a structure supporting the lamellae configured to support the plurality of lamellae in a condition of parallel and spaced apart lamellae along a direction orthogonal to the development axes B. The structure supporting the lamellae is configured to support the plurality of lamellae in a rotatable manner about a rotation axis parallel to or coincident with its development axis B.

Within the scope of the present description and in the subsequent claims, by "substantially planar conformation" it is intended to indicate a conformation that is substantially invariant with respect to the development axis B of the lamella and/or with a section orthogonal to the development axis B that is substantially constant.

Within the scope of the present description and in the subsequent claims, by "configured to support the plurality of lamellae in a condition of spaced apart lamellae along a direction orthogonal to the development axes B" is intended to mean both configurations in which the lamellae are supported spaced apart in a fixed manner, and configurations in which the lamellae are supported spaced apart at a distance that is adjustable between a maximum distance and a minimum distance or retraction distance.

According to the present invention, each lamella of the plurality of lamellae includes at least one surface portion comprising at least:

a reflective layer having at least one reflective surface, and
a chromatic diffusion layer having a first surface proximal to the reflective surface and a second surface, opposite and substantially parallel to the first, configured to be illuminated by incident light.

Specifically, the chromatic diffusion layer comprises a nano-pillar or nano-pore structure in a first material having a first refractive index, immersed in a second material having a second refractive index other than the first, in which the first and second materials are substantially non-absorbing or transparent to electromagnetic radiations with wavelength comprised in the visible spectrum.

In particular, the ratio between a higher refractive index and a lower refractive index chosen between the first and second refractive indexes is comprised between 1.05 and 3. Furthermore, the nano-pillars or nano-pores have locally a development along a main direction not parallel to the first surface and the second surface of the chromatic diffusion layer. In other words, the nano-pillars or nano-pores are not coplanar or parallel to the surfaces of the chromatic diffusion layer, i.e. they extend between them.

Again, the nano-pillar or nano-pore structure is characterised by a plurality of geometric parameters comprising a nano-pillar diameter or nano-pore diameter $d_p$, a nano-pillar or nano-pore length $l_p$ along said non-parallel direction, a nano-pillar or nano-pore surface density $D_p$ and a porosity of structure $P_p$, wherein the plurality of geometric parameters is configured to provide the unit with a higher regular reflectance for wavelengths of the incident light comprised in the range of red with respect to wavelengths of the incident light comprised in the range of blue and a higher diffuse reflectance for wavelengths of the incident light comprised in the range of blue with respect to wavelengths of the incident light comprised in the range of red.

By "range of red" it is meant a range of wavelengths comprised between 600 nm and 740 nm.

By "range of blue" it is meant in a broad sense a range of wavelengths comprised between 380 nm and 500 nm, thus also comprising the wavelengths that conventionally range from violet to cyan.

Advantageously, the nano-pore or nano-pillar layer allows obtaining chromatic effects similar to those obtained through a layer of material loaded with nanoparticles of the type described in the International Patent Application no. PCT/EP2015/001454, when illuminated by a collimated beam of incident light, wherein by collimated beam it is meant a beam of light having a main direction of propagation and an angular divergence around said direction of propagation less than 45°, preferably less than 10°, even more preferably less than 2°. In addition, the nano-pore or nano-pillar layer is particularly resistant and offers a high degree of uniformity. In particular, thanks to the solution according to the present invention which can be realised by means of relatively simple techniques that allow the treatment of large surfaces, it is possible to obtain a chromatic diffusion layer of constant thickness also with reference to different lamellae, for example obtained by cutting the treated large surfaces. In other words, it is possible to obtain uniform diffuse reflectance and regular reflectance coefficients along the entire extension of the unit—that is, the regular reflectance and the diffuse reflectance do not depend on the specific local conformation of the chromatic layer that clads the lamellae.

The unit according to the present invention can comprise one or more of the following additional characteristics, which can also be combined together at will in order to satisfy specific requirements defined by a corresponding application purpose.

In a variant of the invention, the lamellae of the unit can have a regular reflectance in blue R(450 nm)—measured at the wavelength equal to 450 nm by way of reference—which is comprised in the range from 0.05 to 0.95, preferably from 0.1 to 0.9. In some examples, the regular reflectance in blue R(450 nm) is comprised between 0.2 and 0.8. In variants that want to simulate the presence of a clear blue sky, the regular reflectance in blue R(450 nm) can be comprised in the range from 0.4 to 0.95, preferably from 0.5 to 0.9, preferably between 0.6 and 0.8. In variants that want to reduce/minimize the contribution of the reflected scene, the regular reflectance in blue R(450 nm) can be comprised in the range from 0.05 to 0.6, preferably from 0.1 to 0.5, preferably from 0.2 up to 0.4.

In a variant of the invention, the regular reflectance in red R(630 nm), measured by way of reference at the wavelength equal to 630 nm, is at least 1.05 times, preferably 1.2 times, even more preferably 1.6 times greater than the regular reflectance in blue R(450 nm).

In a variant of the invention, the diffuse reflectance in blue R(450 nm) is at least 1.2 times, preferably at least 1.4 times, more preferably at least 1.6 times greater than the diffuse reflectance in the red R(630 nm).

In a variant of the invention, the regularly reflected beam has a CCT of at least 10% less, preferably at least 15%, more preferably of at least 20% than the CCT of the incident beam.

In a variant of the invention, the diffusedly reflected beam has a CCT of at least 20% higher, preferably at least 30%, more preferably of at least 50% than the CCT of the incident beam.

To quantify the chromatic separation it is also possible to define a variation in the CCT of the regularly reflected beam with respect to the CCT of the incident beam. The reduction indicated above is characteristic of a shift of the CCT of the regularly reflected beam towards red and at the same time a shift of the CCT of the diffusedly reflected beam towards blue, since the chromatic diffusion layer is made in a first and a second material that are both substantially non-absorbing, or transparent to electromagnetic radiations with wavelength comprised in the visible spectrum.

In a variant of the invention, the Euclidean distance on the chromaticity diagram CIE 1976 u'-v' between the colour point of the regularly reflected beam ($u'_R$, $v'_R$) with respect to the white colour point ($u'_B$,$v'_B$)—where $u'_B$=0.210 and $v'_B$=0.474 for the standard illuminator defined below—is equal to at least 0.01, preferably 0.015, more preferably 0.02 with $u'_R > u'_B$ and $v'_R > v'_B$. To quantify the chromatic separation it is also possible to calculate a shift of the colour point on the chromaticity diagram CIE 1976 u'-v' between the position of the colour point of the incident beam (white point) and the position of the colour point of the regularly reflected beam. As seen above with reference to the CCT, in the unit according to the invention a shift in the direction of the red of the regularly reflected beam necessarily implies a shift in the direction of the blue of the colour point associable with the diffused light (diffusedly reflected light), thus being index of the phenomenon of chromatic separation.

In the context of the present description and the subsequent claims, for the quantification of CCT values, in general and for those indicated above, reference is made to an incident beam produced by a standard illuminator CIE D65. Otherwise, for the quantification of the values u'-v', in general and for those indicated above, reference is made to an incident illumination coming from a white light source, for example a standard illuminator CIE E, which within the visible spectrum radiates equal energy and has a constant spectral power distribution (SPD). Although this is a theoretical reference, the standard illuminator CIE E is particularly suitable in the event of diffusion variability as a function of the wavelengths, as it has a uniform spectral weight with respect to all wavelengths.

According to an embodiment, it is possible to associate to the set of single developments of the nano-pillars or nano-pores with respect to the main direction, an order parameter S defined as $S=2<\cos^2\vartheta>-1$ comprised between 0.7 and 1, more preferably between 0.9 and 1, wherein $\vartheta$ is the (flat) angle comprised between the main development direction identified in a section plane transversal to the surfaces of the chromatic diffusion layer and an axis associable with each nano-pillar or nano-pore of a plurality of nano-pillars or nano-pores lying in said section plane. The definition of the order parameter S is defined on the basis of the actual experimental measurement methods adopted by the Applicant and better described below.

Thanks to a high order degree along the axis identified by the directrix, there is greater control over chromatic variability for samples that exhibit it.

In a variant of the invention, the diameter $d_p$ is comprised between 40 nm and 300 nm, preferably comprised between 70 nm and 200 nm.

According to an embodiment, the length along the main direction of the nano-pillars or nano-pores is comprised between 300 nm and 200 μm (300 nm<$l_p$<200 μm), preferably comprised between 300 nm and 100 μm (300 nm<$l_p$<100 μm), more comprised preferably between 300 nm and 40 μm (300 nm<$l_p$<40 μm).

In another variant of the invention, the surface density $D_p$ is such as to define an inter-pore or inter-pillar distance $I_p$ less than 2.8 times the diameter $d_p$, preferably less than 2.6 times the diameter $d_p$, more preferably less than 2.4 times the diameter $d_p$.

According to an embodiment, the porosity $P_p$ of the structure is comprised between 20% and 80%, preferably between 25% and 75%.

By means of tests carried out by the Applicant, the ranges of the geometrical parameters have been identified, which allow to establish a chromatic effect in the regular reflection and in the diffused reflection (or simply diffusion), which is expressed, among other things, in the variation of the CCT of a regularly reflected light beam and/or of the CCT of a diffusively reflected (or simply diffused) light beam from each lamella, with respect to the CCT of the incident light beam, both in static mode—that is in conditions whereby, the lamella being illuminated by a beam collimated along a direction at a certain angle of incidence with respect to the local normal of the surface on which the beam strikes, the CCT of the regularly reflected beam and/or that of the diffusedly reflected beam do not substantially depend on this angle of incidence, or in a variable manner, i.e. in conditions whereby the CCT of the regularly reflected beam and/or that of the diffusedly reflected beam depend on the angle of incidence of the beam that illuminates the unit. These ranges of geometric parameters also allow to establish the chromatic effect with particularly thin chromatic diffusion layers.

In particular, in the case of a variable chromatic effect as a function of the angle of incidence of the beam that illuminates the unit, the fact that the plurality of lamellae is supported in a rotatable manner around its own development axis allows to obtain a wide range of chromatic effects. In fact, by varying the inclination of the lamellae with respect to the support structure and therefore with respect to the incident light—for example sunlight or light projected onto the sunshade unit by a lighting source, such as a street lamp—it is possible to vary the diffusive behaviour of the nano-pore or nano-pile layer, obtaining chromatically different effects in terms of both appearance and illumination.

According to a different embodiment, the diameter $d_p$ is greater than a diameter threshold value $d_{p\_threshold}$ and/or the length $l_p$ is greater than a length threshold value $l_{p\_threshold}$ such as to provide a variability in the correlated colour temperature of a luminous flux reflected by the unit by regular reflection, as a function of an angle of incidence, preferably comprised between 0° and 60°, of a corresponding luminous flux incident on the unit with wavelength comprised between 380 nm and 740 nm.

In particular, in the present description and in the subsequent claims by the terms 'light', 'light beam', 'light ray' or 'luminous flux' it is meant one or more electromagnetic radiations with wavelength comprised in the visible spectrum (i.e., substantially 380 nm≤λ≤740 nm). Furthermore, in the present description and in the subsequent claims, by the expression 'collimated beam of light' or 'collimated light beam' it is meant a light beam having a main direction of propagation and an angular divergence around this direction of propagation less than 45°, preferably less than 10°, even more preferably less than 2°.

Preferably, the threshold diameter value $d_{p\_threshold}$ is comprised between 50 nm and 120 nm, more preferably between 60 nm and 100 nm, even more preferably it is equal to about 80 nm.

Preferably, the threshold length value $l_{p\_threshold}$ is comprised between 500 nm and 5 µm, preferably between 1 µm and 4 µm, even more preferably it is equal to about 3 µm.

Thanks to this solution it is possible to obtain lamellae capable of changing the correlated colour temperature of both a regularly reflected luminous flux and a diffusedly reflected luminous flux as a function of the angle of incidence of the beam that illuminates the lamellae. In particular, the parameters make it possible to obtain surfaces capable of varying chromatic tones in a similar way to the earth's atmosphere based on the position of the sun with respect to the horizon.

According to one embodiment, the first material is a metal oxide.

This choice of the first material allows to easily realise a robust and resistant chromatic diffusion layer. In fact, the nano-pillar or nano-pore structure in metal oxide can be obtained in a simple and economical way starting from known oxidation processes—for example, as described in Runge, Jude Mary, "The Metallurgy of Anodizing Aluminum Connecting Science to Practice", 2018, Springer International Publishing—which stimulate the growth of oxide on the metal. This growth takes place in a uniform manner, allowing to obtain layers of substantially any size, characterized by a substantially uniform thickness and therefore able to offer homogeneous chromatic effects.

Furthermore, the metal structure on which the nano-pillar structure is grown can easily assume conformations other than the flat one, without compromising the uniformity of the nano-pillar layer.

Preferably, this metal oxide is aluminium oxide (alumina), titanium oxide (titania) or zinc oxide.

According to an embodiment, the second material is air or a polymer, a resin, a silicone, a different oxide (for example deposited by sol-gel) that are transparent or substantially non-absorbent at least to electromagnetic radiations with wavelength comprised in the visible light spectrum, preferably with refractive index comprised between 1.3 and 1.55, even more preferably between 1.41 and 1.52, for example polyvinyl chloride (PVC), polymethyl methacrylate (PMMA), polyfluorides (e.g. PVDF) or transparent polyacrylates.

By selecting the material in which the nano-pillars or nano-pores structure is immersed, it is possible to further vary the chromatic variability presented by the unit even once the parameters of the nano-pillars or nano-pores have been set.

According to an embodiment, the nano-pillars or nano-pores can have a distribution with respect to the first surface and the second surface of the chromatic diffusion layer divided into coherence areas extending less than 100 µm$^2$, more preferably less than 10 µm$^2$, even more preferably less than 1 µm$^2$, wherein each nano-pillar or nano-pore within one of these coherence areas is substantially equidistant from adjacent nano-pillars or adjacent nano-pores, within the same coherence area.

Within the scope of the present description and in the subsequent claims by "each nano-pillar or nano-pore within a coherence area is equidistant" it is meant that the nano-pillars or nano-pores within this coherence area have the same distance between adjacent pores, unless deviations that are less than 10% with respect to an average distance value calculated on the basis of the values of distances between adjacent nano-pillars or adjacent nano-pores measured within this area.

The Applicant has found that thanks to this characteristic it is possible to avoid the occurrence of interference phenomena due to the Bragg grating diffraction and the presence of iridescence in the reflected or diffused light with the consequent manifestation of colours, such as for example colours in the region of green or fuchsia unrelated to the colour of the natural light of the sky and the sun. Furthermore, the Applicant has observed that a greater randomness of distribution of the nano-pores or nano-pillars inside the structure favours the establishment of the desired chromatic effect.

According to an embodiment, the at least one surface portion of the lamella coincides with at least a first face of the lamella, a pair of opposing faces of the lamella or a set of faces that define the lamella.

According to an embodiment, the rotation axis of the lamellae is either a vertical axis or a horizontal axis.

According to an embodiment, the lamellae are defined by a single sheet, preferably a curved sheet, more preferably a sheet with a constant radius curvature. Preferably, the sheet ends with a reinforcement or folding at the ends along the sides parallel to the development axis and/or with a closure at the ends that are orthogonal to the development axis B.

According to an alternative embodiment, each lamella has opposing sides defined by curved stretches and/or by linear segments, in particular shaped in such a way as to join at the perimeter sides of the lamella.

Preferably, each lamella has a hollow tubular conformation. More preferably, each lamella comprises a pair of sheets facing each other in such a way as to define a section given by a closed convex line.

According to an embodiment, the sunshade cladding unit additionally comprises at least one protection panel at least partially transparent to light, configured to help define a hollow chamber for housing the plurality of lamellae. Preferably, the sunshade cladding unit comprises a pair of parallel panels defining between them a hollow chamber for housing the plurality of lamellae.

Advantageously, the presence of at least one protection panel makes it possible to prevent atmospheric agents from deteriorating the chromatic diffusion layer of the plurality of lamellae comprised in the unit. In this way, it is conveniently possible to dispense with additional protective layers that could alter the optical behaviour of the chromatic diffusion layer.

BRIEF DESCRIPTION OF THE DRAWINGS

The accompanying drawings, which are incorporated herein and form part of the description, illustrate exemplary embodiments of the present invention and, together with the description, are intended to illustrate the principles of the present invention.

In the drawings:

FIG. 1 is a partial perspective view of a first embodiment of a sunshade cladding unit according to the present invention;

FIGS. 1a and 1b are schematic cross-sectional representations of a plurality of lamellae of the sunshade cladding unit of FIG. 1 in two distinct rotation configurations;

DETAILED DESCRIPTION

Figure 2:
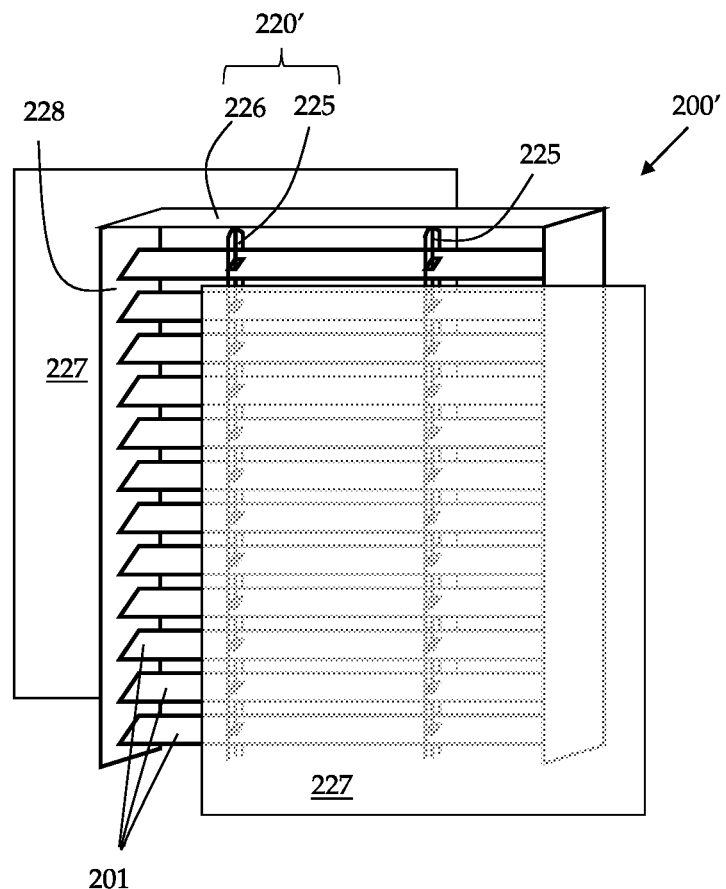
FIG. 2 is a partial cut-away perspective view of a second embodiment of a sunshade cladding unit according to the present invention.

The following is a detailed description of exemplary embodiments of the present invention. The exemplary embodiments described herein and illustrated in the drawings are intended to convey the principles of the present invention, allowing the person skilled in the art to implement and use the present invention in numerous different situations and applications. Therefore, the exemplary embodiments are not intended, nor should they be considered, to limit the scope of patent protection. Rather, the scope of patent protection is defined by the attached claims.

For the illustration of the drawings, use is made in the following description of identical numerals or symbols to indicate construction elements with the same function. Moreover, for clarity of illustration, certain references may not be repeated in all drawings.

The use of "for example", "etc.", "or" indicates non-exclusive alternatives without limitation, unless otherwise indicated. The use of "comprises" and "includes" means "comprises or includes, but not limited to", unless otherwise indicated.

Furthermore, the use of measures, values, shapes and geometric references (such as perpendicular and parallel) associated with terms such as "approximately", "almost", "substantially" or similar, is to be understood as "without measurement errors" or "unless inaccuracies due to manufacturing tolerances" and in any case "less than a slight divergence from the values, measures, shapes or geometric references" with which the term is associated.

Finally, terms such as "first", "second", "upper", "lower", "main" and "secondary" are generally used to distinguish components belonging to the same type, not necessarily implying an order or a priority of relationship or position.

Sunshade Cladding Units

With reference to FIG. 1 it is schematically illustrated a sunshade cladding unit according to a first embodiment of the present invention—hereinafter also simply 'unit' for the sake of brevity—indicated as a whole with 200 in FIG. 1. The unit 200 comprises a plurality of lamellae 201 each having a substantially planar and elongated conformation, which develops along a respective development axis B of the lamella. The lamellae 201 therefore have two substantially flat opposing faces, such as completely flat or slightly curved faces, surrounded by usually little extended perimeter sides, and are arranged parallel to each other and spaced apart along a direction orthogonal to the development axes B of the lamellae. The lamellae 201 are supported in their parallel and spaced apart condition by a support structure 220 which, in the embodiment of FIG. 1, comprises at least one pair of vertical uprights 222. In other embodiments, the vertical uprights 222 may be absent. In the embodiment of FIG. 1, the lamellae 201 are hinged to the uprights 222 in such a way as to be able to rotate around a rotation axis parallel to the respective axis B. To control the rotation of the lamellae 201, in the embodiment of FIG. 1 the support structure 220 comprises two control rods 221 which are movable along the direction orthogonal to the axes B and connected in a fixed manner to a free side of the lamellae 201 in order to drag them in vertical translation, thus determining the inclination of the lamellae 201 around the rotation axis parallel to its axis B as shown in FIGS. 1a and 1b. In particular, the lamellae used in the sunshade cladding unit are of the chromatic effect type.

Figure 2A:
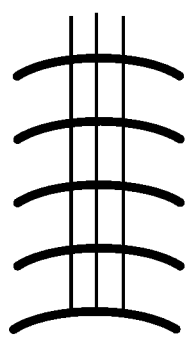
FIGS. 2a and 2b are schematic cross-sectional representations of a plurality of lamellae of the sunshade cladding unit of FIG. 2 in two distinct rotation configurations.
Figure 2B:
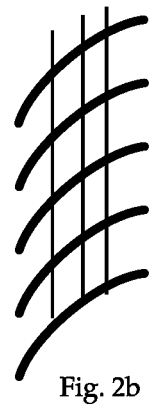

With reference to FIG. 2 it is schematically illustrated a second embodiment of a sunshade cladding unit with chromatic effect 200' according to the present invention. The unit 200' of FIG. 2 comprises a plurality of lamellae 201 each having elongated development along a respective development axis B of the lamella. The lamellae 201 are arranged parallel to each other and spaced apart along a direction orthogonal to the development axes B of the lamellae. The lamellae 201 are supported in their parallel and spaced apart condition by a support structure 220', which, in the embodiment of FIG. 2 comprises a plurality of suspension ties 225 connected to an upper support bar 226. The suspension ties 225 are tied to the lamellae 201 in a known manner, so that they can all be controlled simultaneously in rotation, each preferably around its own development axis B or, alternatively, around a rotation axis parallel to the development axis B as shown in FIGS. 2a and 2b. In addition, the suspension ties 225 are tied to the lamellae 201 in such a way that the lamellae 201 are lifted as they approach each other until a condition of maximum lifting and/or retraction of the lamellae 201 is achieved. Also in this case the lamellae used in the sunshade cladding unit are of the chromatic effect type.

In the exemplary and non-limiting embodiment of FIG. 2, the sunshade cladding unit 200' is supported in a suspended configuration at the upper support bar 226 and between a pair of panels 227 at least partially transparent to visible light, for example made of glass, constrained in such a way that a housing hollow chamber is defined between them in which the unit 200' is arranged. In particular, the sunshade cladding unit 200' comprises a housing hollow chamber configured as a closed hollow chamber. Advantageously, a closed hollow chamber ensures maximum thermal insulation. For example, in order to minimise air turbulences and thus maximise thermal insulation, a closed hollow chamber has a reduced thickness, for example a thickness of a few cm measured with respect to a direction orthogonal to the development axis B, for example a thickness comprised between 2 cm and 15 cm, preferably comprised between 3 cm and 12 cm, more preferably comprised between 4 cm and 10 cm. In some embodiments, the sunshade cladding unit 200' comprises lamellae having a thickness, measured with respect to a direction orthogonal to the development axis B, comprised between 1 cm and 14 cm, preferably between 2 cm and 11 cm, more preferably between 3 cm and 9 cm.

Alternatively, the sunshade cladding unit 200' comprises a housing hollow chamber configured as an open hollow chamber, for example a chamber open on at least one pair of sides, such as for example the open hollow chambers used in the context of glass façades referred to as "double skin". Advantageously, a sunshade cladding unit 200' comprising an open hollow chamber allows to house lamellae of greater size and/or with better performance and/or with better aesthetic quality and/or with greater strength and durability than a sunshade cladding unit 200' comprising a closed hollow chamber. For example, an open hollow chamber has a thickness measured with respect to a direction orthogonal to the development axis B comprised between 5 cm and 40 cm, preferably between 10 cm and 30 cm, more preferably between 15 cm and 25 cm. In some embodiments, the sunshade cladding unit 200' comprises lamellae having a thickness measured with respect to a direction orthogonal to the development axis B comprised between 1 cm and 90 cm, preferably between 2 cm and 45 cm, more preferably between 3 cm and 25 cm.

In the embodiment of FIG. 2, the two transparent panels 227 are constrained to a support frame 228 which also comprises the upper support bar 226.

Figure 3:
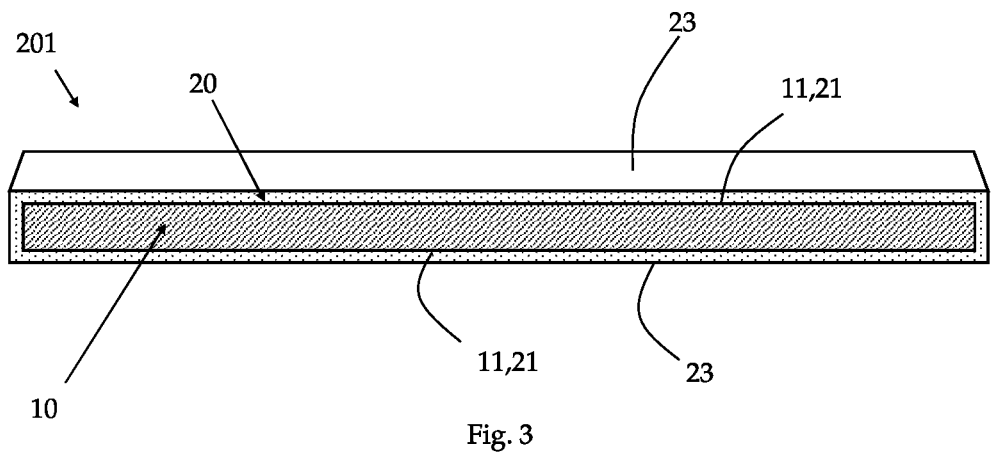
FIG. 3 is a perspective cross-sectional view of a lamella of a sunshade cladding unit according to the present invention.

With reference to FIG. 3 it is schematically illustrated a chromatic effect lamella 201 of the plurality of lamellae 201 comprised in the sunshade cladding unit 200,200' according to the present invention, hereinafter also referred to as "lamella 201" for the sake of brevity. In detail, the lamella 201 comprises on at least one face or s side a reflective layer 10 clad with a chromatic diffusion layer 20 that are coupled together. In the exemplary embodiment of FIG. 3 the lamella 201 consists of a sheet which constitutes the reflective layer 10 and is clad on both faces as well as on the perimeter sides with a chromatic diffusion layer 20. In particular, in FIG. 3 the lamella 201 is schematically represented as a completely flat sheet.

Figure 3A:
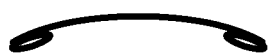
FIGS. 3a-3f are schematic cross-sectional representations of lamellae usable in the sunshade cladding units according to the present invention.
Figure 3B:
Figure 3C:

In alternative embodiments, the lamellae 201 are defined by a curved sheet—for example with a constant radius curvature, obtained for example by calendering—which preferably ends with a reinforcement or folding at the ends along the sides parallel to the development axis, as shown in FIG. 3a and/or with a closure at the ends that are orthogonal to the development axis B. FIG. 3a illustrates a section of the curved sheet lamella, which in the specific non-limiting embodiment is presented as an open line, for example a portion of circumference or ellipse, ended at both ends by a curl formed by the folding.

Figure 3D:
Figure 3E:
Figure 3F:
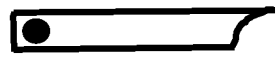

In alternative embodiments, such as those shown in FIGS. 3b-3f, the lamellae may have opposing sides defined by curved stretches and/or by linear segments, in particular shaped so as to join at the perimeter sides. In embodiments not illustrated, the curved stretches and/or the linear segments extend beyond the joining lines of the opposite sides. In preferred embodiments, the lamellae 201 have a hollow tubular conformation, thus comprising a pair of facing sheets so as to define a section given by a closed convex line, for example with a double C- (shown in FIG. 3b), elliptical, rhomboid section (shown in FIG. 3c) or, alternatively, a concave closed line. With reference to the section of the lamellae 201, the rotation axis may be arranged at the centre of gravity or shifted with respect thereto, for example in proximity to an angle or vertex of the section (some examples of which are shown in FIGS. 3d-3f).

Figure 12:
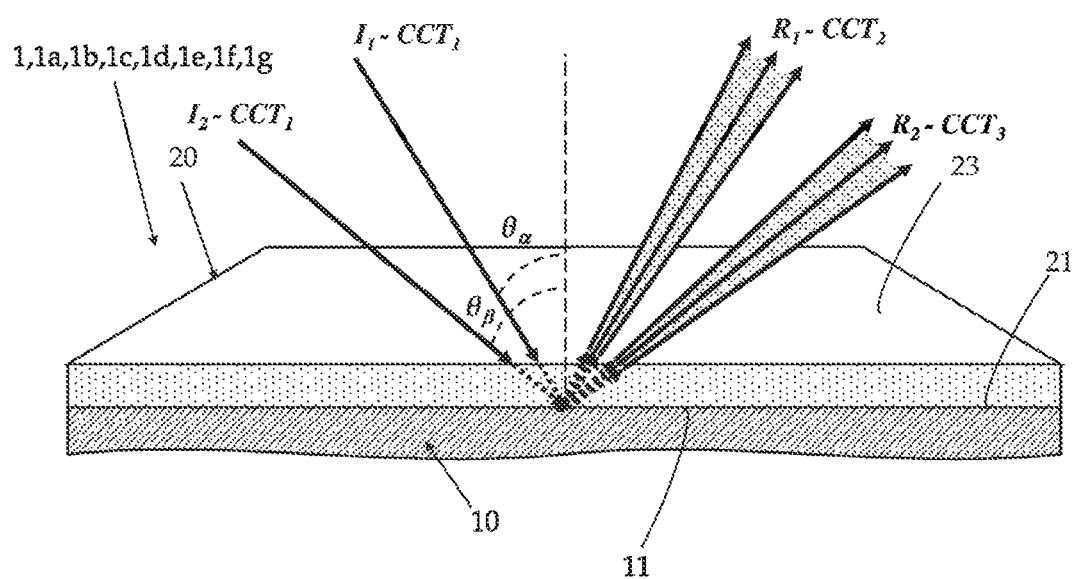
FIG. 12 corresponds to an enlarged detail of FIG. 3 in which a chromatic variability effect of the sunshade cladding unit is schematically illustrated according to an embodiment of the present invention.

In detail, the reflective layer 10 comprises at least one surface 11 configured to regularly reflect an incident light beam comprising one or more electromagnetic radiations having wavelengths included at least in the visible spectrum (i.e., 380 nm≤λ≤740 nm), also indicated with the terms 'light beam', 'light' ray, 'luminous flux' or 'light' in the following. For example, the reflective layer has a regular reflectance of at least 50%, preferably at least 75%, more preferably at least 90% is made of a metallic material, such as aluminium (Al), titanium (Ti), silver (Ag), zinc (Zn), etc. or an alloy, such as stainless steel, comprising such materials. Optionally, the reflective surface 11 of the reflective layer 10 can be subjected to a polishing process (mechanical or chemical). The reflected light beam can have a luminous intensity profile with angular opening equal to or slightly greater than the angular opening of the luminous intensity profile of the incident light beam as a function of the characteristics of the reflective surface 11. In FIG. 12 the case in which the interaction with the reflective surface 11 results in a slight increase in the angular opening of the reflected beam with respect to the angular opening of the incident beam is schematically shown.

The chromatic diffusion layer 20 comprises a first surface 21 proximal to the reflective surface 11 and a second surface 23, opposite and substantially parallel to the first surface 21, separated by a thickness t. In the embodiment considered, the first surface 21 of the chromatic diffusion layer 20 is coupled to the reflective surface 11 of the reflective layer 10, while the second surface 23 faces the external environment. In particular, the second surface 23 is configured to be illuminated by incident light.

Figure 4A:
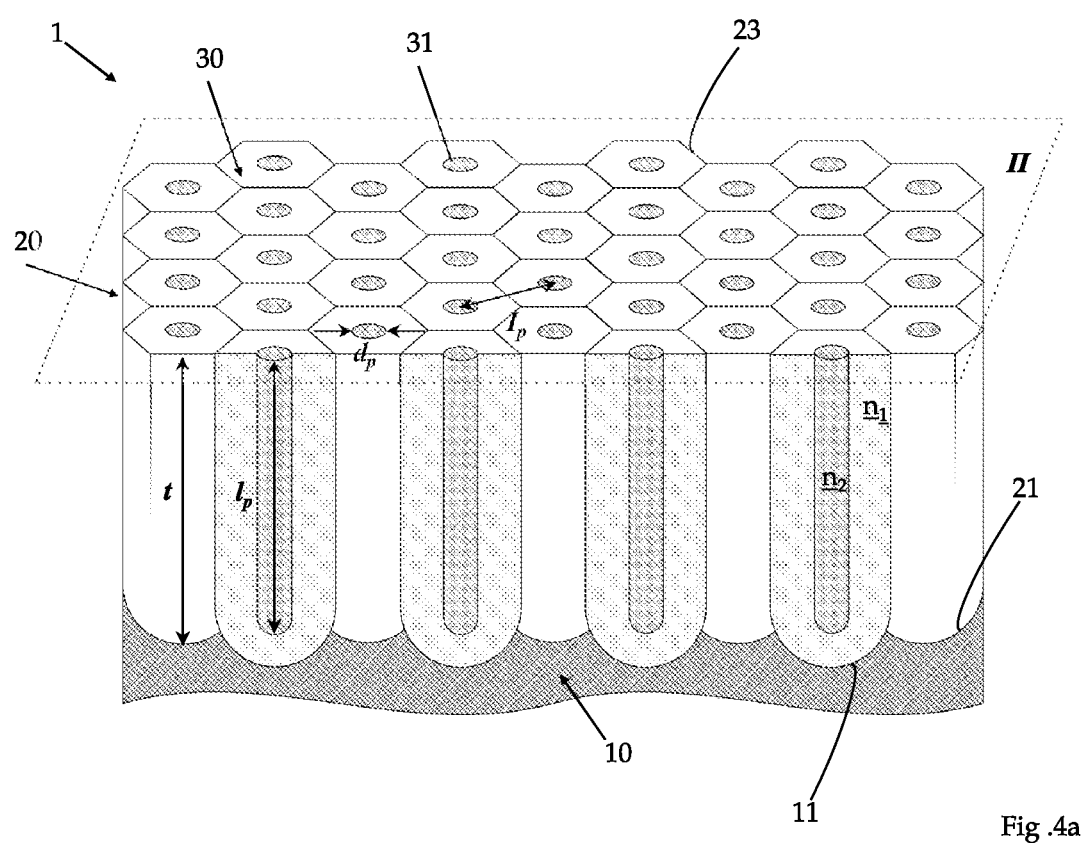
FIGS. 4a-4d are schematic cut-away axonometric views of a lamella portion of a sunshade cladding unit in accordance with various embodiments of the present invention.
Figure 4B:
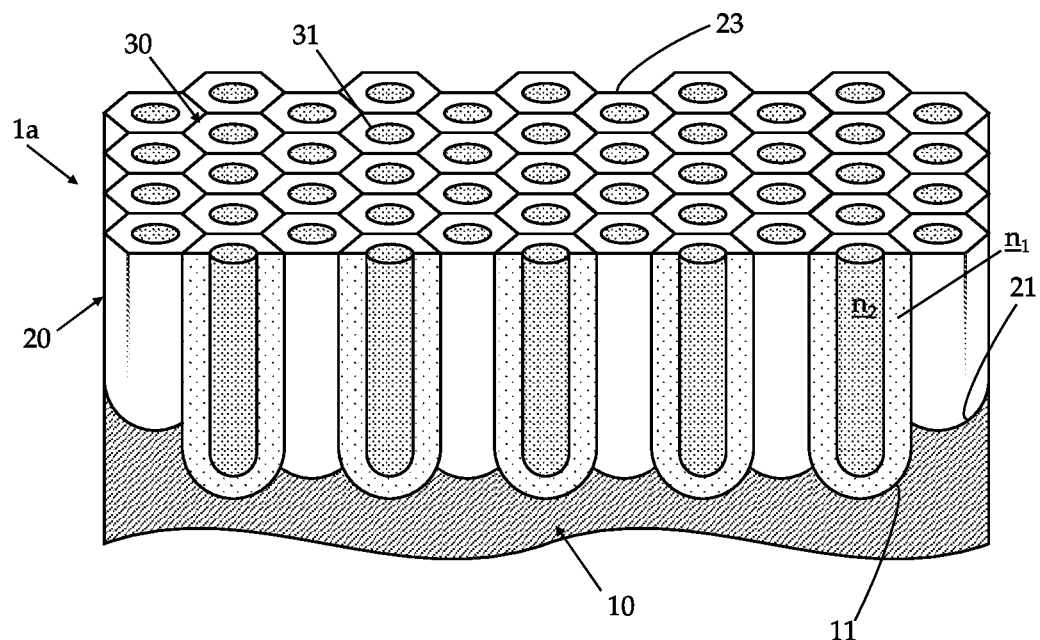
Figure 4C:
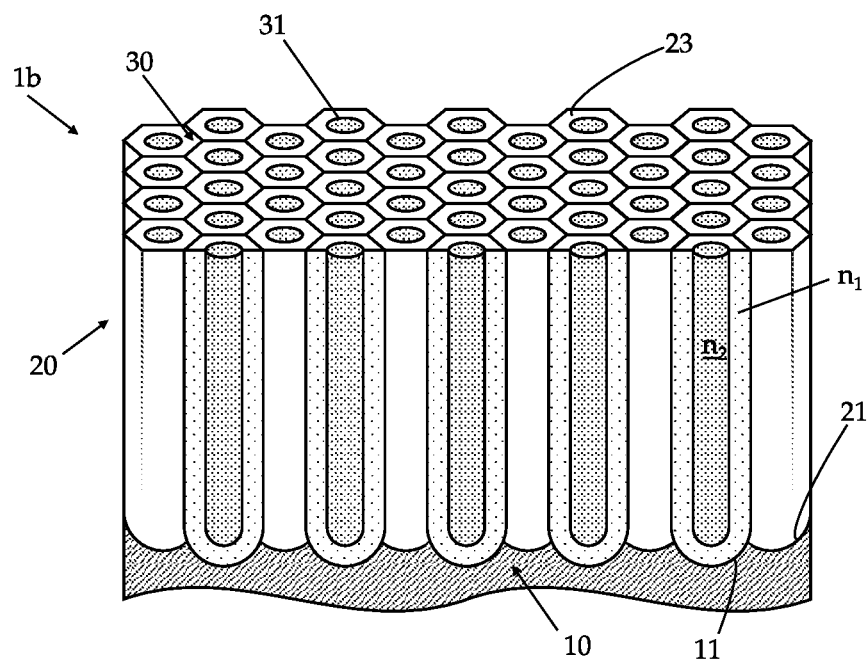
Figure 4D:
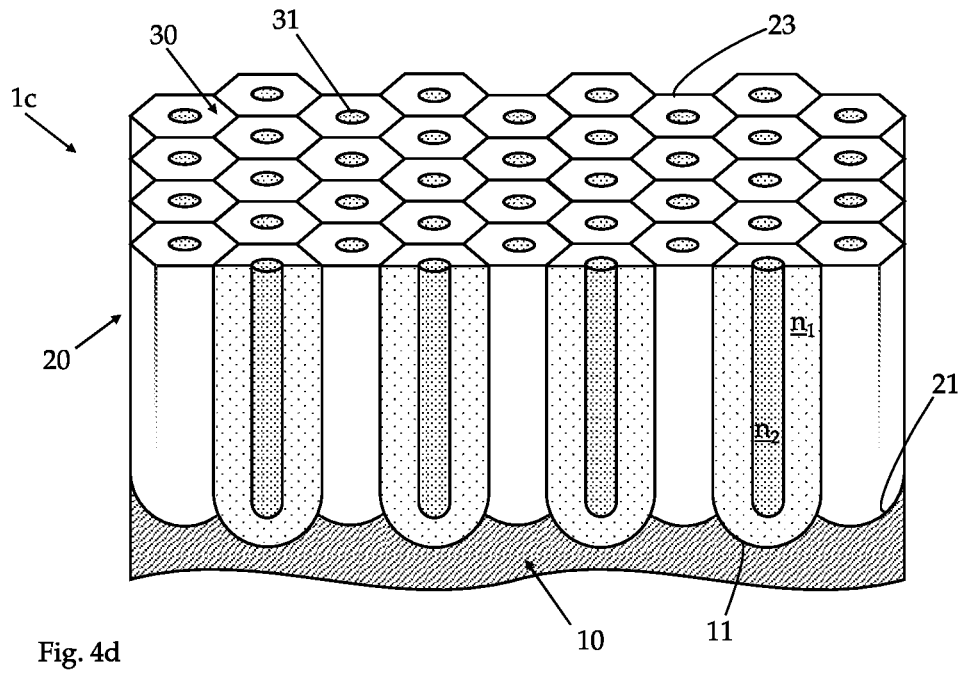
Figure 5:
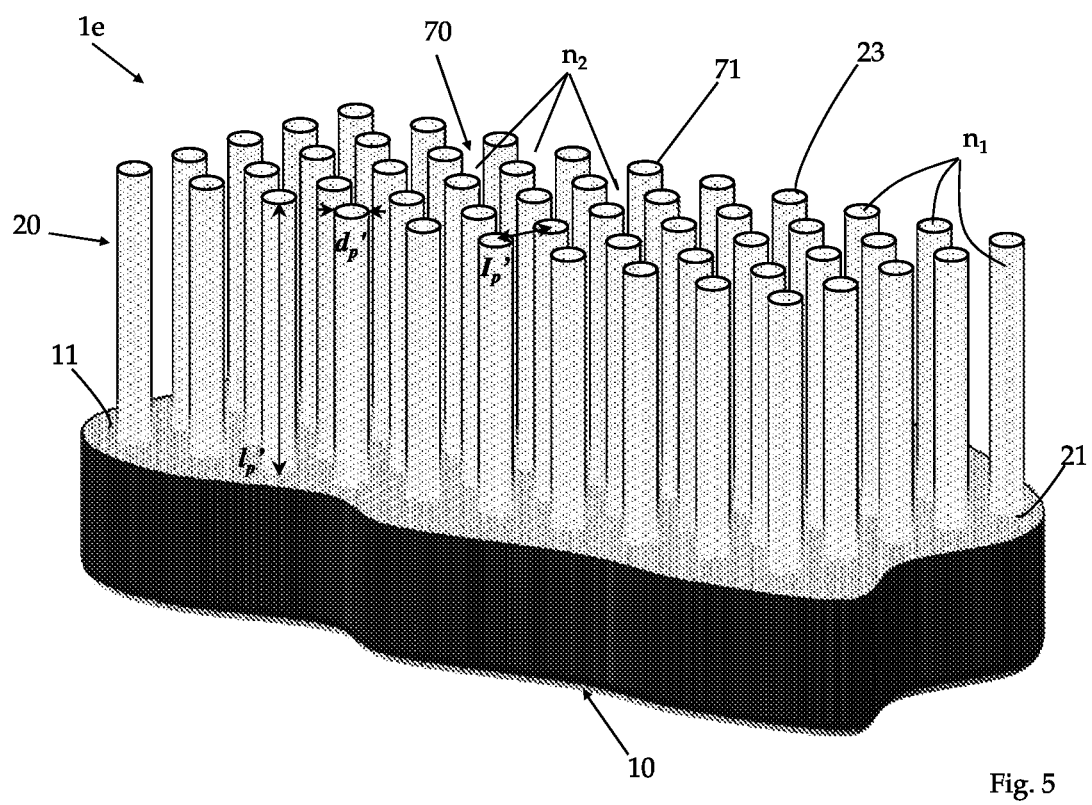
FIG. 5 is a schematic cut-away axonometric view of a lamella portion of a sunshade cladding unit in accordance with another embodiment of the present invention.
Figure 6A:
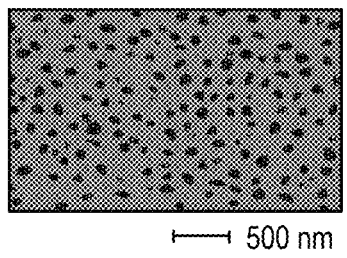
FIG. 6 reports SEM images showing the surface of six different chromatic diffusion layers of as many lamellae of sunshade cladding units according to different embodiments of the present invention.
Figure 6D:
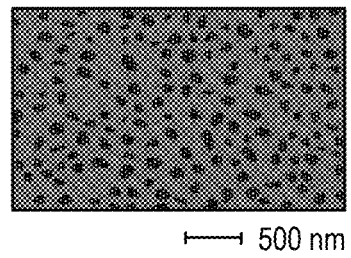
Figure 6B:
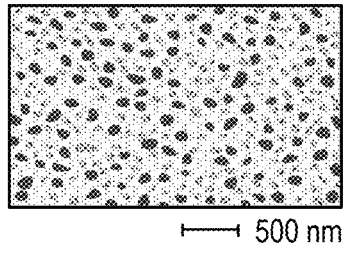
Figure 6E:
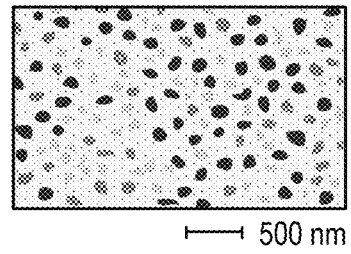
Figure 6C:
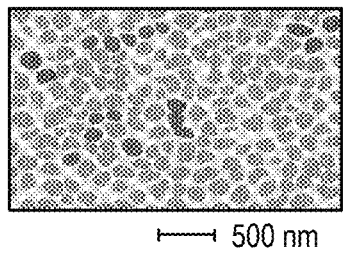
Figure 6F:
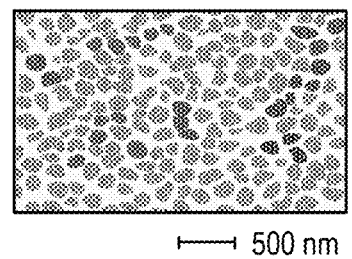
Figure 7:
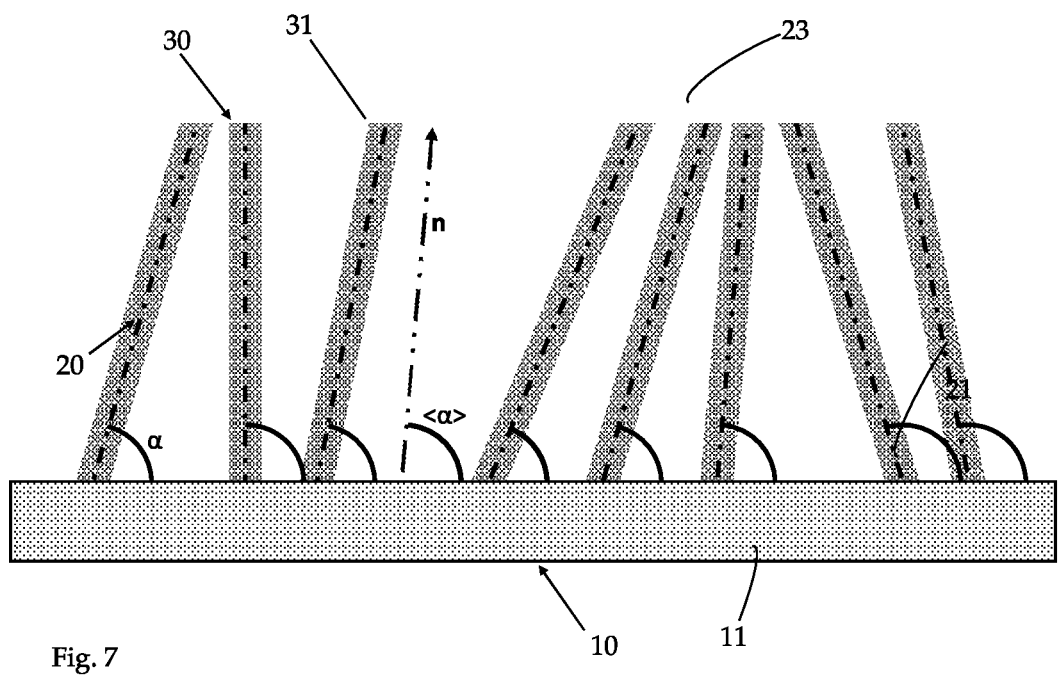
FIGS. 7 and 8 are schematic side views of a lamella portion of a sunshade cladding unit according to an embodiment of the present invention.
Figure 8:
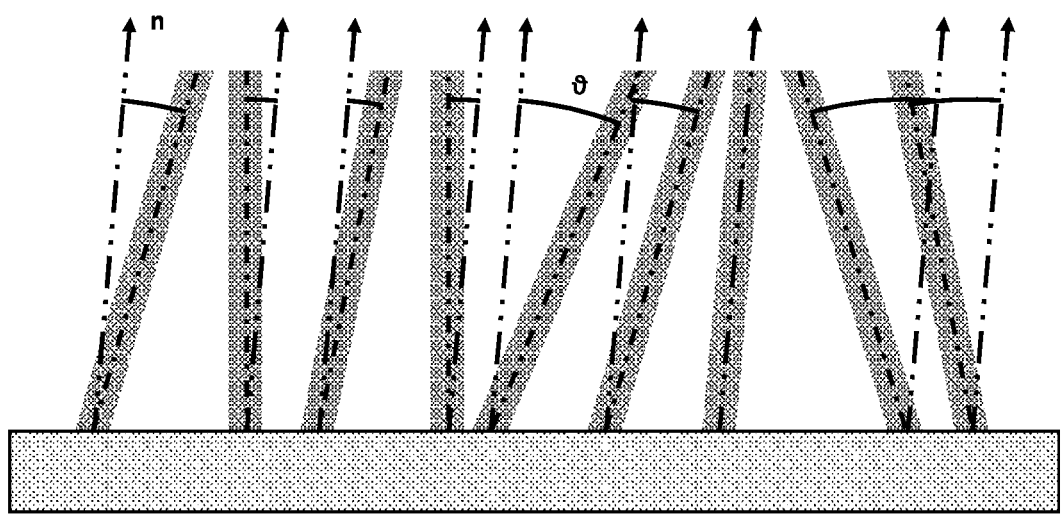
Figure 9:
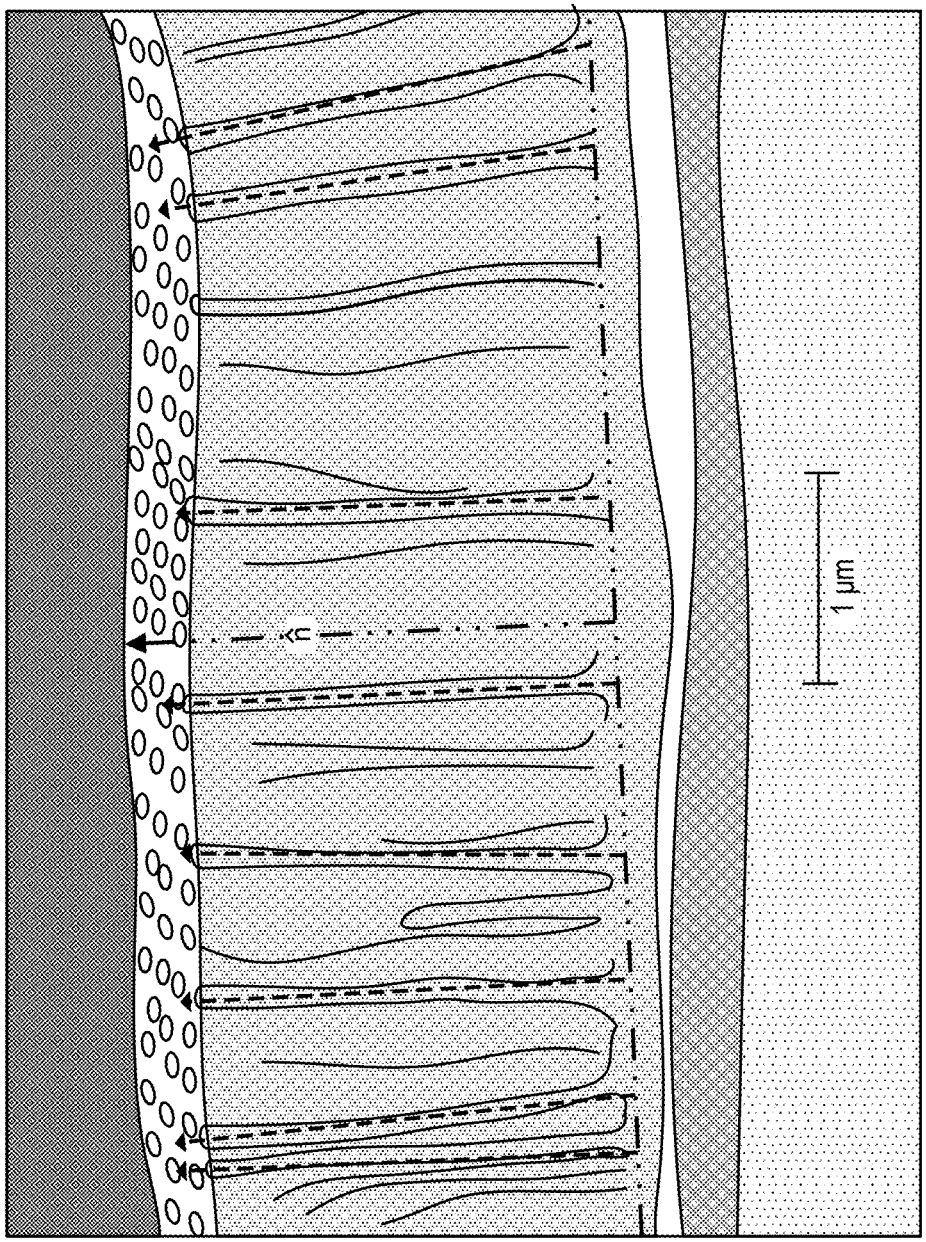
FIGS. 9-11 are SEM images showing cross-sectional side views of three different lamellae of sunshade cladding units according to embodiments of the present invention.
Figure 10:
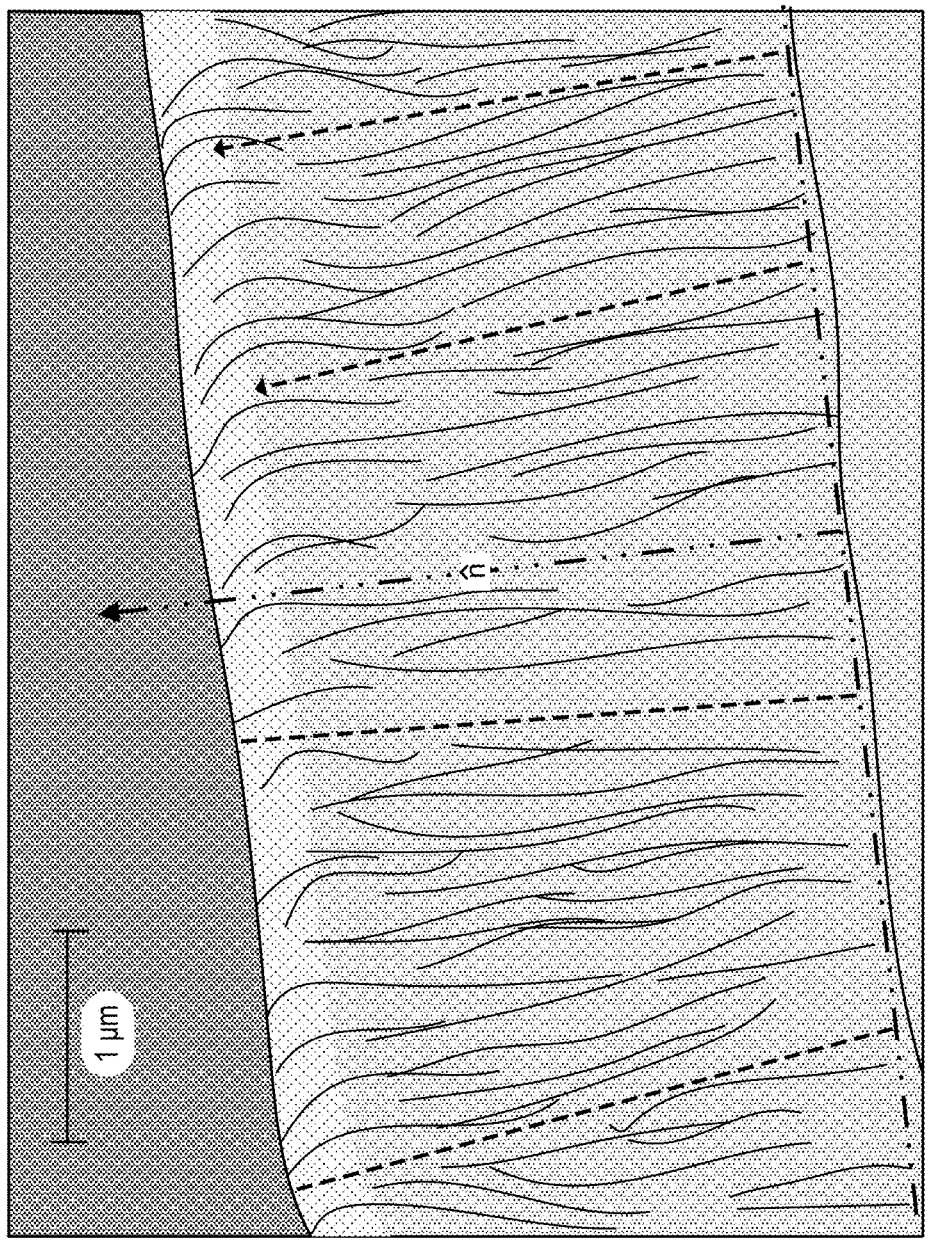
Figure 11:
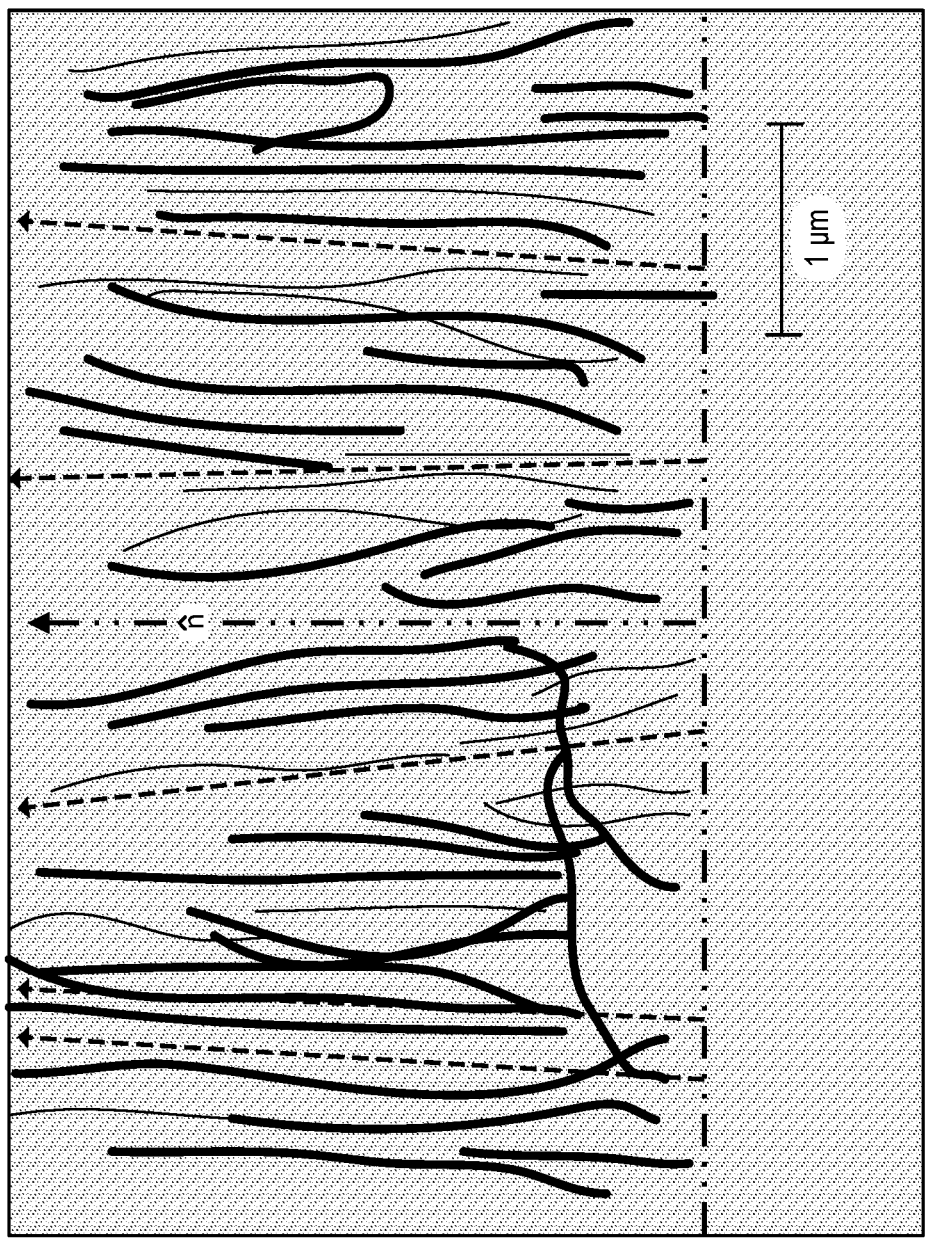

Advantageously, the chromatic diffusion layer 20 comprises a nano-pore 30 structure (illustrated in FIGS. 4a-4d) or a nano-pillar structure 70 (illustrated in FIG. 5). This nano-pore 30 or nano-pillar 70 structure is formed in a first material having a first refractive index $n_1$ and is immersed in a second material having a second refractive index $n_2$. For example, the first material that constitutes the nano-pore 30 structure is aluminium oxide, or alumina ($Al_2O_3$), preferably anodic aluminium oxide or AAO (acronym for the expression 'Anodic Aluminum Oxide').

Otherwise, the second material which fills the nano-pore 30 structure or in which the nano-pillar 70 structure is immersed is air, a polymer, a resin, a silicone, a different oxide (for example deposited by sol-gel) that are transparent or substantially non-absorbent at least to electromagnetic radiations with wavelength comprised in the visible light spectrum, with refractive index $n_2$ comprised between 1.3 and 1.55, preferably between 1.41 and 1.52, for example polyvinyl chloride (PVC), polymethyl methacrylate (PMMA), polyfluorides (eg PVDF) or transparent polyacrylates.

Nano-Pore Structure

The nano-pore 30 structure comprises a plurality of nano-pores 31 (as schematically illustrated in FIGS. 4a-4d) formed in the first material (for example aluminium oxide), having a distribution that in the specific example of FIGS. 4a-4d has a substantially hexagonal conformation with respect to a plane Π (illustrated in FIG. 4a) substantially parallel to the first and second surfaces 21 and 23; for example, the plane in which the second surface 23 of the chromatic diffusion layer 20 lies.

Each nano-pore 31 comprises an opening facing the second surface 23 of the chromatic diffusion layer 20 and extends in the chromatic diffusion layer 20 towards the first surface 21 of this layer 20. As will be evident to the skilled person, the nano-pores 31 have, in general, a non-regular shape as evident in FIG. 6—which shows six top views a)-f) obtained by scanning electron microscopy (acronym SEM) of as many real nano-pore structures—instead of a regular circular shape as illustrated for simplicity's sake in the schematic examples of FIGS. 4a-4d.

Advantageously, the surface dimension of each nano-pore 31 is defined by a diameter $d_p$ corresponding to a circumference that inscribes the pore 31 in the plane Π. In other words, the diameter $d_p$ is preferably determined at the second surface 23 and is, substantially, a measure of the maximum distance between two points on the edge of the nano-pore 30 structure which delimits a corresponding opening of the nano-pore 31.

Furthermore, each nano-pore 31 develops from the first surface 21 towards the second surface 23 defining a length dimension $l_p$. Although FIGS. 4a-4d illustrate—for simplicity's sake—pores 31 that are parallel to each other and orthogonal to the surfaces 21 and 23 of the chromatic diffusion layer 20, the nano-pores 31 extend, in general, for the length dimension $l_p$ along respective non-parallel directions (i.e. transversal) with respect to the first surface 21 and to the second surface 23 of the layer 20 and in any case not strictly parallel to each other—as evident in FIGS. 7-11, which show side views of real nano-pore 30 structures sectioned along a plane (section plane) substantially transversal to the surfaces 21 and 23 of the chromatic diffusion layer 20 obtained by SEM. In the case of ordered nano-pore 30 structures, it is possible to identify in the section plane a main (group) development direction $\hat{n}$ for the nano-pores 31—as illustrated in FIGS. 7-11—and characterize the nano-pore 30 structure through a directional order parameter S (two-dimensional), measured with respect to the main development direction $\hat{n}$ in the section plane transversal to the surfaces 21 and 23 of the chromatic diffusion layer 20, and calculated as:

$$S = 2\langle\cos^2\vartheta\rangle - 1, \quad (1)$$

wherein $\vartheta$ is the (flat) angle comprised between the main development direction $\hat{n}$ and an axis associable with each nano-pore 31 of a plurality of nano-pillars or nano-pores lying in the section plane. In detail, as illustrated schematically in FIG. 7, the main development direction $\hat{n}$ is defined as the direction identified by the average value $\langle\alpha\rangle$ of the angles $\alpha$ defined between the intersection straight line between the section plane and the first surface 21—corresponding to the reflective surface 11 of the substrate 10 in the example considered—and each nano-pore 31 along a plane transversal to the surfaces 21 and 23 of the chromatic diffusion layer 20, where the transversal plane coincides with the section plane. As will be evident to the person skilled in the art, in the case of total disorder the average value of $\langle\cos^2\vartheta\rangle$ is ½, hence S=0, while for a perfectly ordered system (axes of nano-pores 31 aligned to the directrix) we have $\langle\cos^2\vartheta\rangle=1$, hence S=1.

In the context of the present description and subsequent claims, by "ordered nano-pore structure" it is meant a nano-pore 30 structure of the chromatic diffusion layer 20 of the lamella 201 characterized by a directional order parameter S comprised between 0.7 and 1 (i.e. $0.7 \leq S \leq 1$) or, more preferably between 0.9 and 1 (i.e. $0.9 \leq S \leq 1$) for at least one section plane.

The Applicant has identified that it is possible to determine the order parameter in the following way. Initially, an image of a cross section of the chromatic diffusion layer 20 is collected through scanning electron microscope (SEM) for which it is reasonable to identify the first surface 21 with a substantially straight line. Next, the image is analysed to identify a statistically significant number—for example, equal to or greater than 50 distinct elements—of 31 nano-pores with an aspect ratio between height (i.e., length dimension $l_p$) and width (i.e. diameter $d_p$) of the nano-pore 31 at least equal to 10—which can reasonably be approximated to a segment. In particular, if a nano-pore 31 defines one or more bifurcations—as visible in FIG. 9—each bifurcation is considered as a distinct nano-pore 31, where each of such distinct nano-pores 31 shares a common portion. If it is not possible to identify a statistically significant number of nano-pores 31 with this aspect ratio, the image is discarded and a new image is acquired. Subsequently, for each identified nano-pore 31 a development axis is defined, by joining the ends of the nano-pore 31. For each development axis thus defined, an angle $\alpha$ is measured between this axis and the intersection straight line between the section plane and the first surface 21—in other words, an angle $\alpha$ is measured for each nano-pore 31 with the desired aspect factor, identified in the image. The angles $\alpha$ are then averaged to obtain an average angle $\langle\alpha\rangle$ along which the main directrix is oriented $\hat{n}$ with respect to the first surface. The deviation angle $\vartheta$ with respect to the main directrix $\hat{n}$ of the axes of each nano-pore 31 previously considered is therefore measured. Finally, these deviation angles are used for calculating the order parameter S according to the formula (1) above.

The nano-pore 30 structure is also characterized by the ratio $n_M/n_m$ between a higher refractive index $n_M$ a lower refractive index $n_m$ of the refractive indexes $n_1, n_2$ that characterize the first material of which the nano-pores 31 are made and the second nano-pore filling material 31.

In the considered embodiment, the nano-pores 31 are filled with air. Therefore the walls of the pores 31 define an interface surface between the materials characterized by different refractive indexes. Alternatively, other filling materials can be used to fill the nano-pores 31 and obtain different desired refractive index ratios as described below. For example, alternative filling materials comprise, in a non-limiting way, a polymer, a resin, a silicone, a different oxide (for example deposited by sol-gel) that are substantially transparent at least to electromagnetic radiations with wavelength included in the light visible spectrum. In other words, the nano-pore 30 structure is immersed in the selected filling material.

Figure 17:
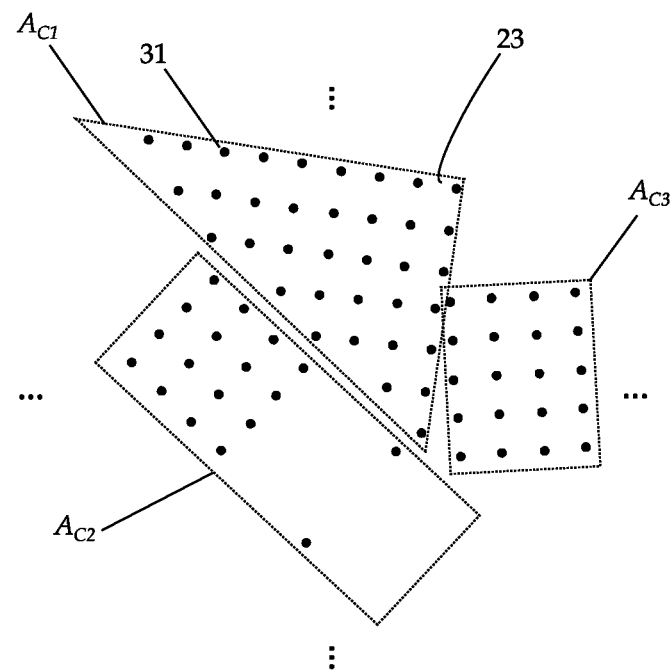
FIG. 17 schematically illustrates three different coherence areas of the nano-pore structure comprised in a lamella of a sunshade cladding unit according to an embodiment of the present invention.

The nano-pore 30 structure is also characterized by a periodicity of the arrangement of the nano-pillars or nano-pores limited to coherence areas $A_{C1}$, $A_{C2}$ and $A_{C3}$, schematically illustrated in FIG. 17, having an extension of less than 100 µm$^2$, more preferably 10 µm$^2$, even more preferably less than 1 µm$^2$. In each of these coherence areas, each nano-pore 31 inside is equidistant from the adjacent nano-pores 31 within the same coherence area. In the present description, the term 'adjacent' is intended to indicate the nano-pores 31 placed at a minimum distance (substantially corresponding to the inter-pore distance Ip) from a reference nano-pore 31 along any direction that lies in the reference plane—for example the plane Π—and passes through said reference nano-pore 31.

Furthermore, it is possible to define a surface density $D_p$ in terms of number of nano-pores 31 per unit area of the second surface 23 of the chromatic diffusion layer 20 which can be measured as the number of nano-pores per square micron or in terms of (average) distance between adjacent pores, or inter-pores distance Ip, and a porosity $P_p$ of the structure 30 defined as the percentage of area occupied by the material having a lower refractive index $n_m$ (for example air) with respect to the area of the second surface 23.

In general terms, therefore, a nano-pore 30 structure according to the invention is of the ordered type, has a limited periodicity and can be characterized through a series of geometric parameters including in particular:

the diameter $d_p$ of the pores 31;
the length dimension $l_p$ of the pores 31;
the surface density $D_p$ of the pores 31;
the porosity $P_p$; and
the ratio $n_M/n_m$ between the refractive indexes of the materials making up the structure 30.

The Applicant has determined that, in the case of ordered and limitedly periodic nano-pore structures 30, thanks to the combined effect of the chromatic diffusion layer 20 and of the reflective layer 10, the control of the aforesaid geometric parameters allows to control the establishment of a chromatic reflection and diffusion effect of the incident light, i.e. a dependence of the regular reflectance and the diffuse reflectance of the lamella 201 on the wavelength, which, again as a function of these parameters, can be of a static type, i.e. independent of the direction of illumination of the lamella 201 with respect to the normal to its surface, or of a variable type, that is of a type dependent on this angle of illumination, resulting in two distinct chromatic effects of the lamella 201 perceived by an observer.

A first chromatic effect, indicated as chromatically static, is due to the interaction of a light beam incident on the lamella 201 with the nano-pore 31 structure so that the lamella 201 has a higher regular reflectance for wavelengths of incident light comprised in the range of red with respect to wavelengths of incident light comprised in the range of blue. Otherwise, the nano-pore 31 structure affects the diffuse reflectance of the lamella 201, making it greater for wavelengths of incident light comprised in the range of blue with respect to wavelengths of the incident light comprised in the range of red. Consequently, when a light beam hits the lamella 201, the electromagnetic radiations with wavelengths comprised in the blue (380 nm≤λ≤500 nm) of the light beam preferentially undergo a diffusion—also referred to as scattering—with respect to the wavelengths comprised in the range of red (600 nm≤λ≤720 nm).

For example, the lamella 201 does not substantially absorb light in the visible range and diffuses light at the wavelength of 450 nm (blue) at least 1.2 times, for example at least 1.4 times, as well as at least 1.6 times more efficiently than the light at the wavelength of about 630 nm (red). In other words, at a wavelength of 450 nm (blue) the diffuse reflectance of the lamella 201 is at least 1.2 times, for example at least 1.4 times, as well as at least 1.6 times greater than the diffuse reflectance at 630 nm (red).

Similarly, the lamella 201 regularly reflects the light at a wavelength of 630 nm (red) at least 1.05 times, e.g. at least 1.2 times, as well as at least 1.6 times, more efficiently than the light at a wavelength of about 450 nm (blue). In other words, at the wavelength of 630 nm (red) the regular reflectance of the lamella 201 is at least 1.05 times, for example at least 1.2 times, as well as at least 1.6 times greater than the regular reflectance at 450 nm (blue).

Consequently, the lamella 201 assumes a substantially light blue colour—due to the diffuse reflection—when hit by a substantially directional (collimated) beam of white light, for example a beam of white light that strikes on the surface of the lamella from a direction which forms an angle θ with respect to the normal of said surface and having divergence less than 45°, preferably less than 10°, even more preferably less than 2°—for example, solar radiation—if observed from any direction substantially other than the specular direction with respect to the illumination direction, i.e. from a direction such that the observer does not see the specular reflection of the source, for example from a direction forming an angle with the specular direction with respect to the direction of the incident beam greater than semi-divergence of said incident light beam. At the same time the lamella, when hit by a directional light beam of white light, assumes a warm colour, for example a yellow colour, or preferably orange, or even more preferably reddish, if observed in the specular direction with respect to the illumination direction, i.e. from a direction such that the observer sees the specular reflection of the source. This first chromatic effect does not vary as the angle of incidence θ varies and is therefore indicated as chromatically static.

A second chromatic effect, indicated as chromatically variable, occurs at the onset of a dependence of the regular reflectance and/or diffuse reflectance of the lamella 201 not only on the wavelength, but also on the direction of illumination or of incidence θ.

In other words, the colour whereby an observer sees the lamella 201 from a direction of observation in proximity to the direction of specular reflection, and possibly, but not necessarily, also the colour whereby an observer sees the lamella 201 from an observation direction far from the direction of specular reflection, depends on the angle of incidence θ of the light beam incident on the lamella 201.

In fact, the correlated colour temperature (acronym CCT) of the regularly reflected beam appears to depend on the angle of incidence θ of the corresponding incident light beam with respect to the normal to the lamella or to the reflective surface 11 of the reflective layer 10. In particular, in the examples considered, the correlated colour temperature of the regularly reflected light beam decreases as the angle of incidence θ of the light beam incident on the lamella 201 increases. For example, as schematically illustrated in FIG. 12, when a first light beam $I_1$ having a correlated colour temperature $CCT_1$, strikes on the lamella 201 with an angle $\theta_a$ with respect to the normal to the reflective surface 11 of the reflective layer 10, a corresponding first regularly reflected light beam $R_1$ will be obtained having a first correlated colour temperature $CCT_2$ other than a second correlated colour temperature $CCT_3$ of a regularly reflected light beam $R_2$ generated by the regular reflection of a second light beam $I_2$ having spectral content and CCT identical to those of the light beam $I_1$, but incident on the lamella 201 with an angle $\theta_\beta$ with respect to the normal to the reflective surface 11 of the reflective layer 10, other than the angle $\theta_\alpha$. In particular, the first correlated colour temperature $CCT_2$ of the first reflected beam is greater than the second correlated colour temperature $CCT_3$ of the second reflected beam, when the angle $\theta_\beta$ is greater than the angle $\theta_0$.

Figure 13:
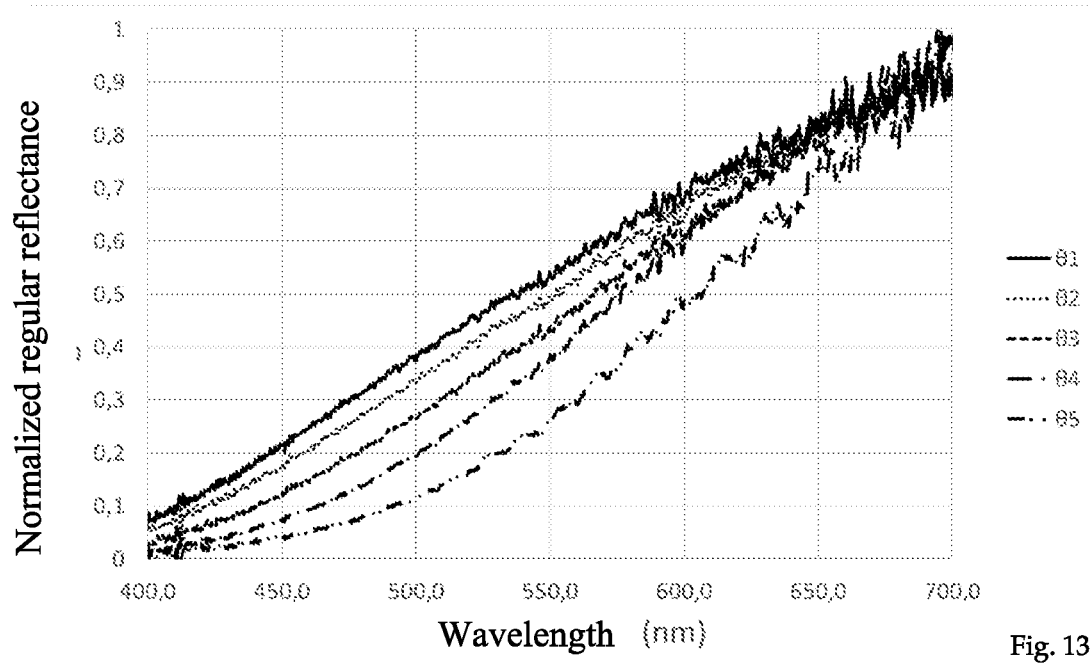
FIG. 13 is a graph of the course of the regular reflectance of the sunshade cladding unit according to embodiments of the present invention as a function of the wavelength of an electromagnetic radiation as the angle of incidence of a light beam on the unit varies.

In other words, the chromatic behaviour of the lamella 201 depends on the angle with which a light beam strikes on the lamella 201 itself. In particular, the regular reflectance R turns out to be a function of the incident wavelength a and of the angle of incidence θ of a corresponding incident light beam, R(λ, θ), as illustrated in FIG. 13, where the dependence of the regular reflectance R(λ, θ) is traced as a function of the wavelength, normalized to the maximum value of this regular reflectance in the wavelength range and for the angle considered, for different angles of incidence $\theta_1=10°$, $\theta_2=20°$, $\theta_3=30°$, $\theta_4=40°$ and $\theta_5=50°$ of a corresponding incident light beam. As is evident from FIG. 13, the decrease in the value of the regular spectral reflectance as the wavelength decreases is greater the greater the angle of incidence θ. It results (i) from the increase in diffuse reflectance as the angle θ increases (i.e. the luminance of the lamella 201 observed for directions far from that of specular reflection increases as the illumination angle θ increases), and (ii) from the fact that the diffuse reflectance is greater for wavelengths in the range of blue than in that of red.

Figure 14:
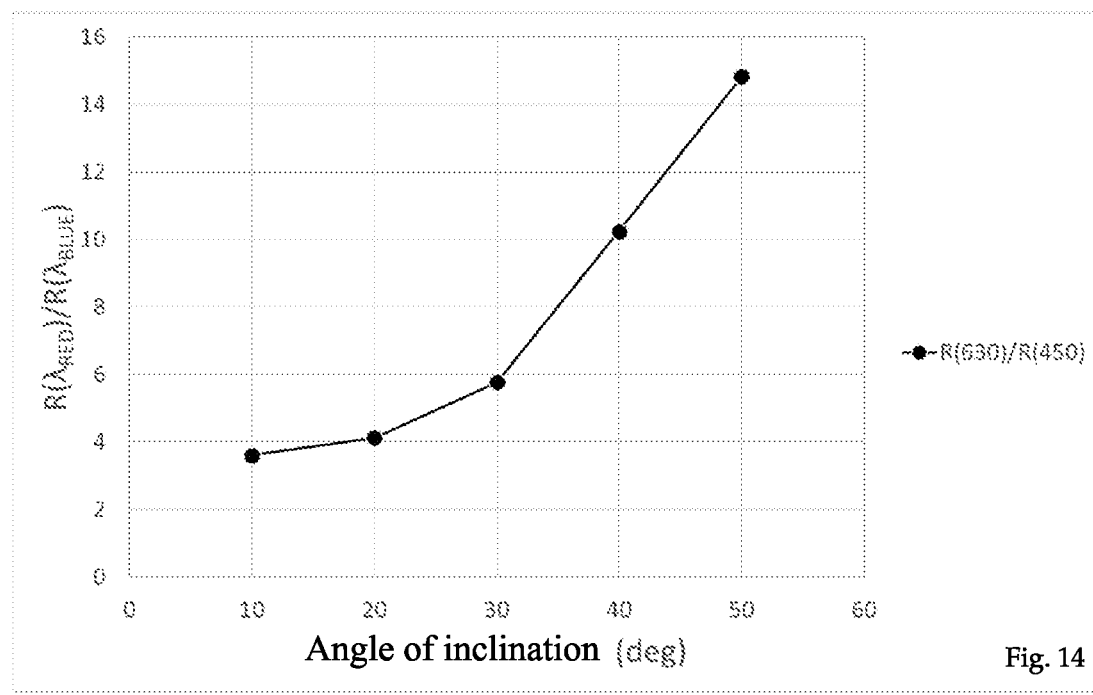
FIG. 14 is a graph of the course of the ratio between the reflectance of the unit according to an embodiment of the present invention at two different wavelengths as a function of the angle of incidence of a light beam on the unit.

The Applicant has determined that it is possible to define the chromatic variability of the lamella 201 as a function of the angle of illumination θ as a ratio between the regular reflectances evaluated at two different wavelengths for different angles of incidence θ. Preferably, the ratio $r=R(\lambda_r, \theta)/R(\lambda_b, \theta)$ of the electromagnetic radiation reflectances at the wavelengths of $\lambda_b$ 450 nm and $\lambda_r$ 630 nm, is considered, as shown in FIG. 14. If there is no chromatic variation, this ratio r remains almost constant as θ varies. On the contrary, if there is a chromatic variation, like in the example of FIG. 14, this ratio increases as the angle θ increases.

In view of the above, the Applicant has determined that it is possible to establish the effect of static chromatic reflection and diffusion, that is to control the dependence of the regular reflectance and of the diffuse reflectance on the wavelength, and therefore the colour of the lamella 201 observed for near and far directions, respectively, from the direction of specular reflection of a beam of white light that illuminates the lamella 201, as well as the effect of variable reflection and chromatic diffusion, and therefore the dependence of both regular and diffuse reflectances on the angle of incidence of the illuminating beam, acting on one or more of the following parameters characterizing the ordered nanopore structures 30 of the chromatic diffusion layer 20:

the length $l_p$ of the nano-pores 31;
the surface density $D_p$ of the nano-pores 31 (i.e., the inter-pore distance Ip);
the diameter $d_p$ of the nano-pores 31,
the porosity $P_p$ of the nano-pore 30 structure, and
the ratio $n_M/n_m$ between the higher refractive index $n_M$ and the lower refractive index $n_m$ between the refractive index $n_2$ of the pore filling material—for example, air—and the refractive index $n_I$ of the material of the nano-pore 30 structure—i.e., aluminium oxide in the example considered.

Tests carried out by the Applicant have made it possible to highlight how the variation of parameters such as the ratio of indexes $n_M/n_m$ of the materials constituting the nano-pore 30 structure, the length of the nano-pores $l_p$, the diameter of the nano-pores $d_p$, the surface density $D_p$ of the nano-pores and the porosity $P_p$ of the nano-pore 30 structure allow to establish a static or variable chromatic reflection and diffusion effect as the angle of incidence of a corresponding incident light beam of white light varies.

In particular, the Applicant has determined that, in some embodiments, due to the establishment of chromatic reflection and diffusion effects, the ratio $n_M/n_m$ between the higher refractive index $n_M$ and the lower refractive index $n_m$ between the refractive index $n_1$ of the first material and the refractive index $n_2$ of the second material must be comprised between 1.05 and 3, wherein, the refractive indexes $n_1$ and $n_2$ are calculated according to standard refractive index measurements measured with wavelength equal to 589.29 nm.

In other embodiments, the Applicant has found that for the establishment of chromatic reflection and diffusion effects, the ratio $n_M/n_m$ must be preferably comprised between 1.10 and 1.8, more preferably between 1.15 and 1.4 or between 1.6 and 1.78.

In other embodiments, the Applicant has found that for the establishment of chromatic reflection and diffusion effects, the ratio $n_M/n_m$ must be preferably comprised between 1.7 and 2.7, more preferably between 1.7 and 2.05 or between 2.45 and 2.65.

In further embodiments, the Applicant has found that for the establishment of chromatic reflection and diffusion effects, the ratio $n_M/n_m$ must be preferably comprised between 1.4 and 2.1, more preferably between 1.45 and 1.7 or between 1.95 and 2.05.

Furthermore, the Applicant has highlighted how, in some embodiments, the chromatic reflection and diffusion effects of the incident light occur due to:

diameters $d_p$ of the nano-pores 31 comprised between 40 nm and 300 nm, resulting particularly intense for diameters $d_p$ of the nano-pores or nano-pillars 31 comprised between 70 nm and 200 nm, and lengths $l_p$ of the nano-pores 31 comprised between 300 nm and 200 μm (300 nm<$l_p$<200 μm), preferably comprised between 300 nm and 100 μm (300 nm<$l_p$<100 μm), more preferably comprised between 300 nm and 40 μm (300 nm<$l_p$<40 μm).

The Applicant has also observed how, in some embodiments, the chromatic reflection and diffusion effects of the incident light occur for surface densities $D_p$ such as to define an inter-pore distance $I_p$ less than 2.8 times the diameter $d_p$, preferably less 2.6 times the diameter $d_p$, more preferably less than 2.4 times the diameter $d_p$ and/or porosity $P_p$ comprised between 20% and 80%, preferably between 25% and 75%.

By way of example, FIG. 4b schematically illustrates a lamella 201 which comprises a nano-pore 30 structure characterized by dimensional parameters falling within the ranges indicated above.

The Applicant has in particular observed that, in some embodiments, there is an interdependence between the diameters $d_p$ of the nano-pores 31 and lengths $l_p$ of the nano-pores 31 such that in the case of diameters $d_p$ of the nano-pores 31 greater than 70 nm ($d_p$>70 nm) a chromatic reflection and diffusion effect is established already for lengths $l_p$ of the nano-pores 31 comprised between 300 nm and 40 μm (300 nm<$l_p$<40 μm), allowing to shorten the production of the chromatic diffusion layer 20.

The Applicant has also identified, in some embodiments, that in the presence of nano-pore 30 structures in which the length $l_p$ of the nano-pores 31 is greater than a length threshold value $l_{p\_threshold}$ and in any case less than 200 µm, preferably less than 100 µm, the chromatic diffusion effect of the incident light becomes variable as the angle of incidence varies. In particular, in the case where the first material is aluminium oxide, the length threshold value $l_{p\_threshold}$ is generally comprised between 500 nm and 5 µm, preferably between 1 µm and 4 µm, even more preferably it is equal to about 3 µm.

The Applicant has also found, in some embodiments, that in the presence of nano-pore 30 structures in which the length $l_p$ of the nano-pores 31 is greater than the length threshold value $l_{p\_threshold}$, the chromatic effect passes from static to variable, once the diameter $d_p$ of the nano-pores 31 exceeds a diameter threshold value $d_{p\_threshold}$. In particular, in the case where the first material is aluminium oxide, the diameter threshold value $d_{p\_threshold}$ is generally comprised between 50 nm and 120 nm, preferably between 60 nm and 100 nm, even more preferably it is equal to about 80 nm.

For example, FIGS. 4c and 4d schematically show lamellae 201 which respectively comprise a nano-pore structure 30 characterized by dimensional parameters falling within the ranges that lead to a variable chromatic diffusion effect, whereas FIG. 4c illustrates a lamella 201 with a nano-pore structure 30 characterized by a higher surface density $D_p$ of the nano-pores 31 than the surface density $D_p$ of the nano-pores 31 of the nano-pore structure 30 of the lamella 201 of FIG. 4d.

Figure 15:
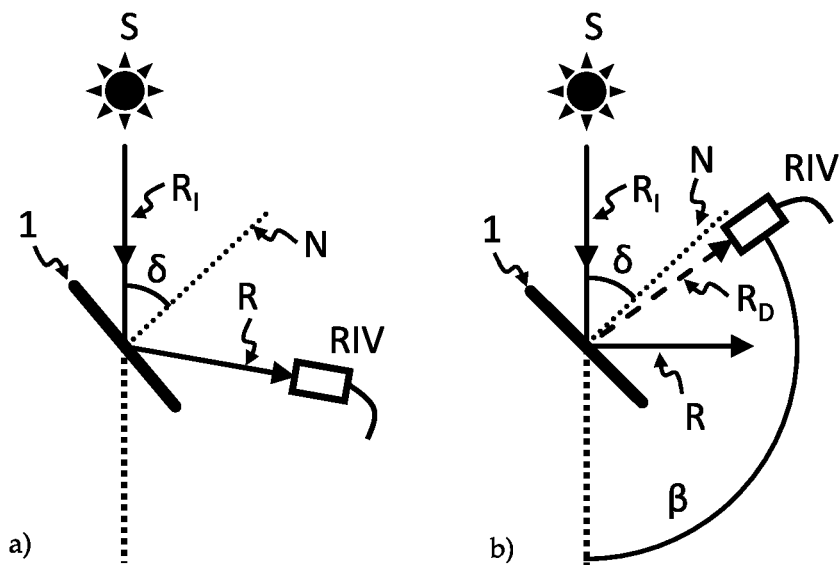
FIGS. 15a and 15b schematically illustrate test arrangements for assessing the chromatic properties of the unit.

As regards the measurement of the dependence of the regular reflectance on the wavelength, one can proceed as illustrated in FIG. 15a. The lamella 201 is oriented such that its normal N (indicated by a dashed line in FIG. 15a) forms an angle δ with the incident ray $R_I$ emitted by a light source S with white light, for example a source having the spectrum of the standard illuminator CIE D65, and where the spectrum of the light reflected at the specular angle is measured by a detector (a spectrophotometer) RIV. This spectrum is thus normalized with respect to the emission spectrum of the source S, acquired for example by positioning the detector RIV on the path of the beam $R_I$ in the absence of the lamella 201. In this way the dependence of the spectral reflectance of the lamella 201 on the wavelength is obtained without having to take into account the spectral characteristics of the source. Finally, a colour point is associated with the spectral profile of regular reflectance in the chromaticity diagram 1976 u'-v'. This point corresponds to the chromatic coordinate that would be obtained by measuring the regular reflective component if the lamella 201 were illuminated by a light source having the spectral characteristics of a standard illuminator CIE E. The measurement can be repeated for different angles δ comprised between 100 and 90°.

To evaluate the colour point associated with a direction of observation far from the direction of specular reflection, one can proceed as illustrated in FIG. 15b. The lamella 201 is oriented such that its normal N forms an angle δ with the incident ray $R_I$ emitted by a light source S with white light; through a detector (a spectrophotometer) RIV placed at an angle β with respect to the incident ray $R_I$ the spectrum of diffused light $R_D$ is recorded, to which a colour point is associated in the chromaticity diagram 1976 u'-v' after normalization of the revealed spectrum, analogously to what is described with reference to the measurement of regular reflectance. The angle β is chosen outside the light cone of the light reflected by the sample (e.g. β=150° for a sample comprising a nano-pore structure with pore directrix perpendicular to the reflective surface).

More generally, the spectrum of the light diffused by the lamella 201 is detected by positioning the detector outside the beam of light regularly reflected by the lamella 201, and a first set of measurements is collected by fixing the inclination of the sample with respect to the direction of the incident beam $R_I$ and by detecting the spectrum of the diffused light at various angles β at which the detector is placed. In particular, the acquired measurements are used to identify the pair of angles (δ, β) that determines the point of maximum distance from the white point (having coordinates ($u'_B$=0.210; $v'_B$=0.474) in the example of FIG. 16).

On the basis of the colour points identified as described above, the nano-pore 30 structure of the lamella 201 is considered in accordance with one of the embodiments of the present invention if the following properties of the colour points derived by the spectral analysis of the beams that are regularly and diffusedly reflected by the lamella 201 considered are verified. In particular, it is verified whether for a standard observer CIE 1931 (2°) the spectrum of the regularly reflected beam corresponds to colour points on the chromaticity diagram CIE 1976 u'-v' with chromaticity coordinates comprised in a region of acceptability of the corresponding colour point to the regular spectral reflectance R of the chromaticity diagram having coordinates u'>0.210 and v'>0.470 (illustrated in FIG. 16). Furthermore, it is verified whether the chromatic coordinates of the colour points of the regularly reflected beam are at a maximum Euclidean distance of less than 0.1 from the defined colour points and the curve defined by the colour points associated with the emission spectrum of a black body, or Planckian locus P, preferably 0.05, even more preferably 0.03. The maximum Euclidean distance $\Delta^R_{max}(u',v')$ between pairs of colour points of the regularly reflected beam among the plurality of colour points of the reflected beam regularly identified at different angles δ is determined. The maximum Euclidean distance $\Delta^R_{max}(u',v')$ is compared with a threshold value $\Delta^R_{threshold}(u',v')$, preferably $\Delta^R_{threshold}(u',v')$=0.02, to determine a chromatically static diffusion characteristic of the lamella, and a chromatically variable diffusion characteristic. In detail:

a. if $\Delta^R_{max}(u',v') \geq \Delta^R_{threshold}(u',v')$ the lamella 201 is chromatically variable;

b. if $\Delta^R_{max}(u',v') < \Delta^R_{threshold}(u',v')$ the lamella 201 is chromatically static.

Figure 16:
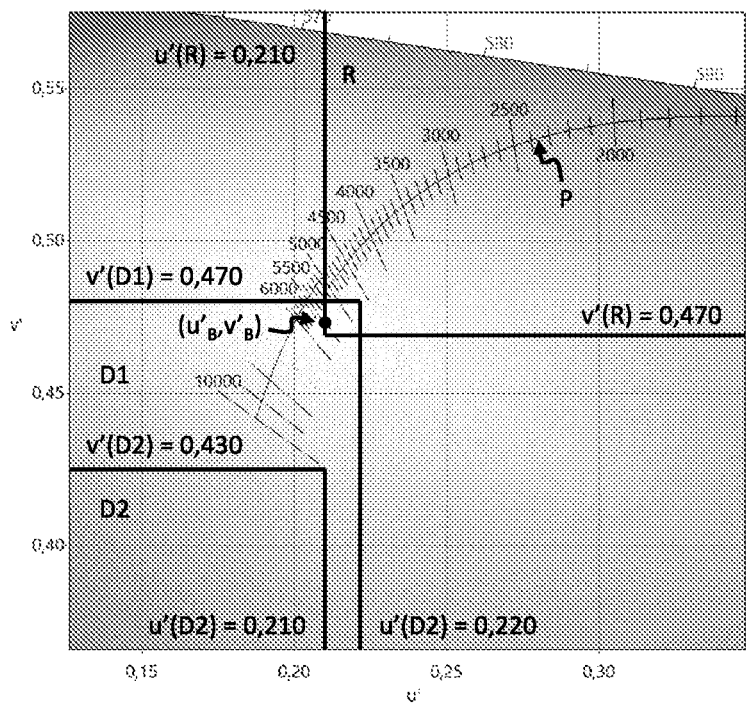
FIG. 16 is a representation of the colour plane in which the desired regions of the colour points of the beams reflected regularly and diffusedly by the unit are highlighted.

Furthermore, in the case where $\Delta^R_{max}(u',v') \geq \Delta^R_{threshold}(u',v')$, then the point of maximum blue (defined as the colour point of the diffused light located at maximum distance from the previously defined white point) in the chromaticity diagram CIE 1976 u'-v' relative to the spectrum of diffused light is comprised in the portion of the plane having coordinates u'<0.220 and v'<0.480, indicated as the first region of acceptability D1 (illustrated in FIG. 16). Otherwise, in the case where $\Delta^R_{max}(u',v') < \Delta^R_{threshold}(u',v')$, then the point of maximum blue is comprised in the portion of the plane having coordinates u'<0.210 and v'<0.430, defined as the second region of acceptability D2 (illustrated in FIG. 16). Furthermore, the minimum Euclidean distance $\Delta^{RD}_{min}$ in the chromaticity diagram CIE 1976 u'-v' between the colour point of maximum blue associated with the diffused light spectrum and the colour point closest thereto among the colour points associated with the reflected light spectrum must be greater than or equal to 0.02, more preferably greater than or equal to 0.03, even more preferably greater than or equal to 0.04. Therefore, it is not possible to obtain a sample such that the colour point of maximum blue associated with the diffused light spectrum and the colour points associated with the reflected light spectrum are within the overlap region between the region of acceptability of the reflection R and the first region of acceptability D1.

Below is a series of exemplary examples relating to various samples of nano-pore structures analysed.

Example 1 According to the Invention—Static Chromatic Diffusion Sample

Sample A with nano-pore structure obtained by anodizing an aluminium substrate (alloy 1050) in 0.1 M phosphoric acid at 20° C. at a potential of 80 V for an anodizing time equal to 60 minutes. The nano-pore structure has a length $l_p$ of 1.5 µm, the pores have a diameter $d_p$ of 85 nm and an inter-pore distance $I_p$ of 185 nm thus equal to 2.2 times the diameter $d_p$. Sample A has a porosity of about 21%. The analysis of sample A allows determining the coordinates of the colour points shown in the following Table 1.

TABLE 1

| salient colour points for sample A | | | |
|---|---|---|---|
| | u' | v' | Planckian distance |
| 10° | 0.2227 | 0.5012 | 0.0015 |
| 50° | 0.2339 | 0.5063 | 0.0028 |
| Blue 50-150 | 0.1772 | 0.3849 | 0.0066 |

The maximum Euclidean distance $\Delta^R_{max}(u',v')$ is equal to 0.012 ($\Delta^R_{max}(u',v')=0.012$), less than the threshold value $\Delta^R_{threshold}(u',v')$. Consequently, the sample A considered is chromatically static. The point of best blue is within the second region of acceptability D2 and the minimum distance between the point of best blue and the points relative to the spectrum of regularly reflected light is $\Delta^{RD}_{min}=0.125$ (acceptable). In other words, the sample A is representative of a lamella 201 usable in a unit in accordance with the present invention characterized by a diffuse reflectance of the static type.

Example 2 According to the Invention—Sample with Variable Chromatic Diffusion

Sample B with nano-pore structure obtained by anodizing an aluminium substrate (alloy 1050) in 0.1 M phosphoric acid at 40° C. at a potential of 80 V for an anodizing time equal to 60 minutes. The nano-pore structure has a length $l_p$ of 8.5 µm, the pores have a diameter $d_p$ of 160 nm and an inter-pore distance $I_p$ of 190 nm thus equal to 1.2 times the diameter $d_p$. Sample B has a porosity of about 50%. The analysis of sample B allows determining the coordinates of the colour points shown in the following Table 2.

TABLE 2

| salient colour points for sample B | | | |
|---|---|---|---|
| | u' | v' | Planckian distance |
| 10° | 0.2436 | 0.5212 | 0.0035 |
| 50° | 0.2932 | 0.5391 | 0.0024 |
| Blue 50-150 | 0.1916 | 0.449 | 0.0015 |

The maximum Euclidean distance $\Delta^R_{max}(u',v')$ is equal to 0.053 ($\Delta^R_{max}(u',v')=0.053$), greater than the threshold value $\Delta^R_{threshold}(u',v')$. The colour points of the reflection are in the area of acceptability R and the point of best blue is within the first region of acceptability D1 and the minimum distance between the point of best blue and the points relative to the spectrum of regularly reflected light is $\Delta^{RD}_{min}=0.089$ (acceptable). Consequently, the sample B considered is chromatically variable. In other words, the sample B is representative of a lamella 201 usable in a unit in accordance with the present invention characterized by a regular/diffuse reflectance of variable type.

Comparative Example 1—Sample with Nano-Pores with Insufficient Diameter

Sample C with nano-pore structure in an aluminium oxide layer grown on aluminium. The nano-pore structure has a length $l_p$ of 30 µm, the pores have a diameter $d_p$ of 25 nm and an inter-pore distance $I_p$ of 65 nm thus equal to 2.6 times the diameter $d_p$. Sample C has a porosity of about 14%. The analysis of sample C allows determining the coordinates of the colour points shown in the following Table 3 (where the value(s) marked with an asterisk symbol identify an unacceptable parameter).

TABLE 3

| salient colour points for sample C | | | |
|---|---|---|---|
| | u' | v' | Planckian distance |
| 10° | 0.2125 | 0.4781 | 0.0087 |
| 50° | 0.2142 | 0.4791 | 0.0092 |
| Blue 50-150 | 0.1965 | 0.4344 (*) | 0.011 |

The maximum Euclidean distance $\Delta^R_{max}(u',v')$ is equal to 0.002 ($\Delta^{RM}_{max}(u',v')=0.002$), less than the threshold value $\Delta^{RU}_{threshold}(u',v')$. Consequently, the sample C considered is not characterized by chromatic variability. Furthermore, the point of best blue is outside the second region of acceptability D2. In other words, sample C is not representative of a lamella 201 usable in a unit according to the present invention, since the diameter $d_p$ of the nano-pores of the nano-pore structure does not allow to obtain the desired diffuse reflectance characteristics.

The comparison of the samples A and B of the examples 1 and 2 according to the invention with the sample C described in the comparative example 1, shows how the variation of the diameter $d_p$ of the nano-pores (therefore also of the porosity $P_p$ of the structure) allows controlling the chromatic characteristics of the lamella 201.

Comparative Example 2—Inadequate Pore Density and Porosity

Sample D with nano-pore structure in an aluminium oxide layer grown on aluminium. The nano-pore structure of sample D has the following characteristics: pore diameter $d_p$ 40 nm, length $l_p$ 30 µm and inter-pore distance $I_p$ of 125 nm, thus equal to 3.1 times the diameter $d_p$. Sample D has a porosity of about 10%. The analysis of sample D allows determining the coordinates of the colour points shown in the following Table 4 (where the value(s) marked with an asterisk symbol identify an unacceptable parameter).

TABLE 4

| salient colour points for sample D | | | |
|---|---|---|---|
| 125-40-30 | u' | v' | Planckian distance |
| 10° | 0.219 | 0.493 | 0.0035 |
| 50° | 0.215 | 0.484 | 0.0059 |
| Blue 50-150 | 0.195 | 0.435 (*) | 0.0044 |

The maximum Euclidean distance $\Delta^R_{max}(u',v')$ is equal to 0.009 ($\Delta^R_{max}(u',v')$=0.009), less than the threshold value $\Delta^R_{threshold}(u',v')$; consequently sample D is chromatically static. Furthermore, the point of maximum blue for sample D is outside the second region of acceptability D2. Therefore, sample D does not represent a lamella 201 usable in a unit in accordance with the present invention since the density of the nano-pores of the nano-pore structure is higher than a maximum density which allows obtaining the desired diffuse reflectance characteristics.

Comparative Example 3—Insufficient Nano-Pore Length

Sample E with nano-pore structure obtained by anodizing an aluminium substrate (alloy 1050) in 0.1 M phosphoric acid at room temperature at a potential of 80 V for an anodizing time of 60 seconds. The nano-pore structure of sample E has the following characteristics: pore diameter $d_p$ 80 nm, length $l_p$ 150 nm and inter-pore distance $I_p$ 185 nm, thus equal to 2.3 times the diameter $d_p$. Sample E has a porosity of about 18%. The analysis of sample E allows determining the coordinates of the colour points shown in the following Table 5 (where the value(s) marked with an asterisk symbol identify an unacceptable parameter).

TABLE 5

| salient colour points for sample E | | | |
|---|---|---|---|
| | u' | v' | Planckian distance |
| 10° | 0.206 (*) | 0.469 (*) | 0.0072 |
| 50° | 0.207 (*) | 0.469 (*) | 0.0079 |
| Blue 50-150 | 0.223 (*) | 0.476 (*) | 0.0154 |

The maximum Euclidean distance $\Delta^R_{max}(u',v')$ is equal to 0.001 ($\Delta^R_{max}(u',v')$=0.001), less than the threshold value $\Delta^R_{threshold}(u',v')$. Consequently, the sample E considered is chromatically static. Furthermore, the point of best blue is outside the second region of acceptability D2. In other words, sample E does not represent a lamella 201 usable in a unit in accordance with the present invention, since the length of the nano-pores of the nano-pore structure is less than a minimum length which allows obtaining the desired diffuse reflectance characteristics.

By comparing the samples A and B of the examples according to the invention with the samples D and E of the comparative examples, it is clear that the variation of the length $l_p$ of the nano-pores, of the density $D_p$ of the nano-pores 31 (therefore also of the porosity $P_p$) of the structure allows controlling the chromatic properties of a lamella 201 usable in a unit according to the present invention.

The Applicant has also found that by varying two or more of these parameters and the diameter $d_p$ of the nano-pores, a synergistic effect is obtained which determines the variation of the correlated colour temperature of a beam of light reflected by a lamella 201 as the angle of incidence of the light beam incident on it varies. Consequently, it is possible to determine different combinations of values of the dimension of the diameter $d_p$, of the length $l_p$ and of the density $D_p$ of the nano-pores 31, as well as of $P_p$ of the structure in order to obtain the same desired chromatic effect, in terms of correlated colour temperature of regularly reflected and diffused light.

Furthermore, the Applicant has determined that, by selecting different materials in which to immerse the nano-pore 30 structure, it is possible to obtain a ratio between the refractive indexes $n_2$ and $n_1$ (comprised between 1.05 and 3) suitable for influencing the diffuse reflectance and the regular reflectance of the chromatic diffusion layer 20 and, therefore, the correlated colour temperature of a beam of light regularly reflected by the lamella 201.

Nano-Structure Growth Process

Figure 18:
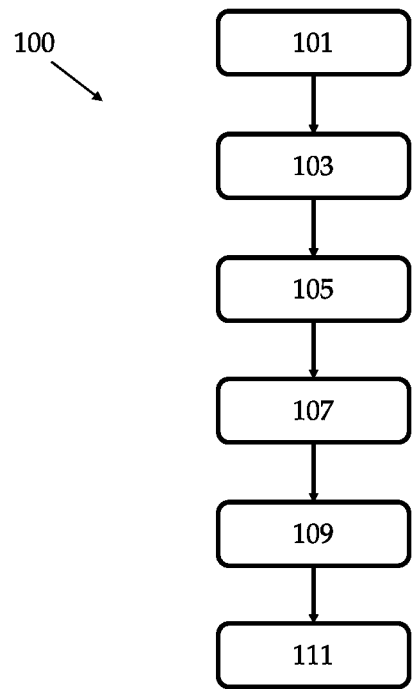
FIG. 18 is a flow chart of a procedure for growing a chromatic diffusion layer comprising a nano-pore structure according to an embodiment of the present invention.

The Applicant has identified a growth process 100, schematically illustrated in FIG. 18, which allows controlling the parameters of the nano-structure 30 included in the chromatic diffusion layer 20 in a particularly effective way.

Initially, a substrate is selected on which to grow the chromatic diffusion layer (block 101). In the example considered, an aluminium alloy plate 1050 is selected as the growth substrate for the chromatic diffusion layer. Advantageously, although not limitingly, this substrate can be used as a reflective layer 10 of the lamella 201.

The substrate is then subjected to polishing, preferably electropolishing, in order to eliminate a layer of native aluminium oxide that covers the substrate and, possibly, reduce a surface ⁻ between 20° C. and 40° C., is maintained.

The Applicant has identified that it is possible to control an average diameter of the nano-pores 31 by adjusting the values of electric potential $\Delta V_a$ and temperature $T_a$. In particular, as the values of electric potential $\Delta V_a$ and temperature $T_a$ increase, it is possible to increase an average pore diameter while maintaining the anodization time interval $\Delta t_a$ constant as indicated in the Table 6 shown below:

TABLE 6

| Electric potential $\Delta V_a$ (V) | Temperature $T_a$ (° C.) | Average diameter of the nano-pores (nm) |
|---|---|---|
| 80 | 20 | 76-86 |
| 80 | 30 | 95-105 |
| 80 | 40 | 153-163 |
| 90 | 20 | 80-90 |
| 90 | 30 | 95-125 |
| 90 | 40 | 175-185 |

Furthermore, the Applicant has observed that it is possible to control the thickness of the chromatic diffusion layer 20 for the same anodization time interval $\Delta t_a$ by adjusting the temperature $T_a$; in particular, the thickness of the chromatic diffusion layer 20 increases as the temperature $T_a$ increases, maintaining the anodization time interval $\Delta t_a$ constant.

Last but not least, the Applicant has identified that it is possible to control the inter-pore distance Ip through a preventive patterning step of the substrate on which to grow the chromatic diffusion layer. This preventive step provides a growth imprint for the pore position of the nano-pore 30 structure. By controlling the diameter $d_p$ and the inter-pore distance Ip it is also possible to set the porosity $P_p$ of the structure 30.

At the end of the anodization, on the substrate there is a chromatic diffusion layer 20 comprising a nano-pore 30 structure with the desired characteristics. Subsequently, the substrate with the chromatic diffusion layer 20 is washed and dried—for example, in a convection oven—in order to remove any foreign bodies present in the nano-pores 31 of the nano-pore 30 structure (block 107).

Optionally, the chromatic diffusion layer 20 is separated from the substrate (block 109) to be coupled with a desired reflective layer 10 (block 111).

The invention thus conceived is susceptible to several modifications and variations, all falling within the scope of the inventive concept. For example, in the alternative embodiment—illustrated in FIG. 5—the chromatic diffusion substrate 20 of the lamella 201 comprises a nano-pillar 70 structure instead of the nano-pore 30 structure described above. In this case, the nano-pillar 70 structure has characteristics similar to the characteristics of the nano-pore 30 structure described above. In particular, the nano-pillars 71 are characterized by length $l_p'$, diameter $d_p'$, directional order parameter S', surface density $D_p'$, porosity $P_p'$ and periodicity substantially corresponding to what is indicated above for nano-pores 31.

Similarly to what has been described above, the nano-pillar 70 structure can be immersed in a material selected to control the ratio between the refractive index $n_2$ of the material surrounding the nano-pillars 71—for example, air—and the refractive index $n_1$ of the material of the nano-pillar 70 structure—for example, aluminium oxide.

The Applicant has found that for the nano-pillar structures 70 it is possible to observe relations similar to those described with reference to the nano-pore 30 structures which link the single geometric parameters to the chromatic effects of the static type and of the variable type described above.

Figure 19:
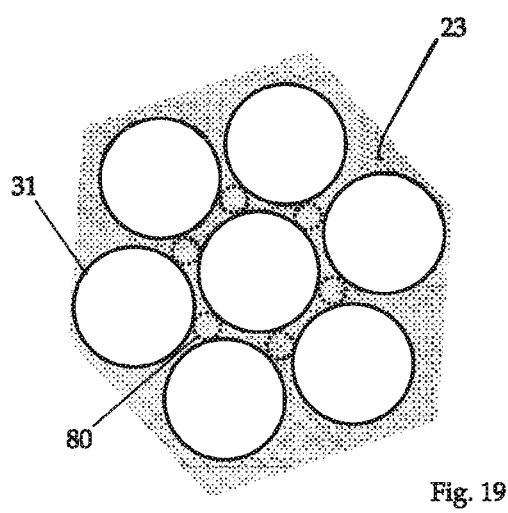
FIG. 19 is a schematic top view of a portion of a lamella of a sunshade cladding unit according to a different embodiment of the present invention.

Furthermore, it is possible to realize a nano-pore 30 structure with nano-pores configured such to delimit a portion of the structure 80 which inscribes a circumference with diameter comprised between 30 nm and 300 nm, as schematically illustrated in FIG. 19. In this case, the nano-pore structure has a behaviour corresponding to a nano-pillar structure of corresponding diameter. In a dual way, it is possible to realize a nano-pillar structure with nano-pillars configured in such a way as to delimit an interspace that inscribes a circumference with diameter comprised between 30 nm and 300 nm. In this case, the nano-pore structure has a behaviour corresponding to a nano-pore structure of corresponding diameter.

In alternative embodiments (not illustrated), the sunshade cladding unit may comprise a nano-pore or nano-pillar structure having a distribution other than the hexagonal distribution, such as for example a square, rectangular, octagonal distribution and so on.

In particular, alternative embodiments of the sunshade cladding unit provide a chromatic diffusion layer in a material other than aluminium oxide, preferably non-absorbent or transparent to electromagnetic radiations with wavelength comprised in the visible spectrum in a similar way to aluminium oxide.

In fact, other types of metal oxides can be used to make the chromatic diffusion layer. For example, in alternative embodiments of the present invention, the nano-pore or nano-pillar structure of the layer is made of titanium oxide, or titania ($TiO_2$), preferably anodic titanium oxide (acronym ATO). Alternatively, the nano-pore structure or, more preferably, the nano-pillar structure can be made of zinc oxide (ZnO).

Furthermore, there is nothing to prevent the definition of the diameter $d_p$ of each nano-pore 31 or nano-pillar 71 as an average value of the diameters of the circumferences that inscribe the nano-pore 31 or nano-pillar 71, calculated at a plurality of predefined distances from the first surface 21 of the chromatic diffusion layer 20 along the development direction of the nano-pore 31 or nano-pillar 71 considered.

Furthermore, a three-dimensional order parameter can be calculated to characterize the main development direction of the nano-pores 31 or nano-pillars 71.

The operation of the sunshade cladding unit 200 according to the present invention is schematically illustrated in FIGS. 20-24 with reference to the case where the lamellae 201 are made as described in example 1, being therefore lamellae with static chromatic diffusion.

Figure 20:
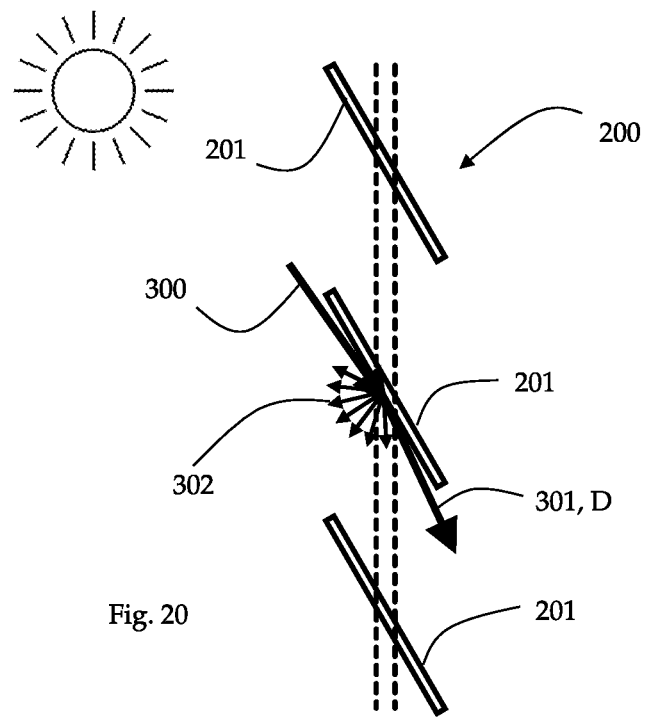
FIGS. 20, 20a-24, 24a are schematic representations of the appearance of a sunshade unit according to the present invention, perceived by an observer placed on an internal side or external side of the unit itself, according to the inclination of the lamellae with respect to in incident sunlight.
Figure 20A:
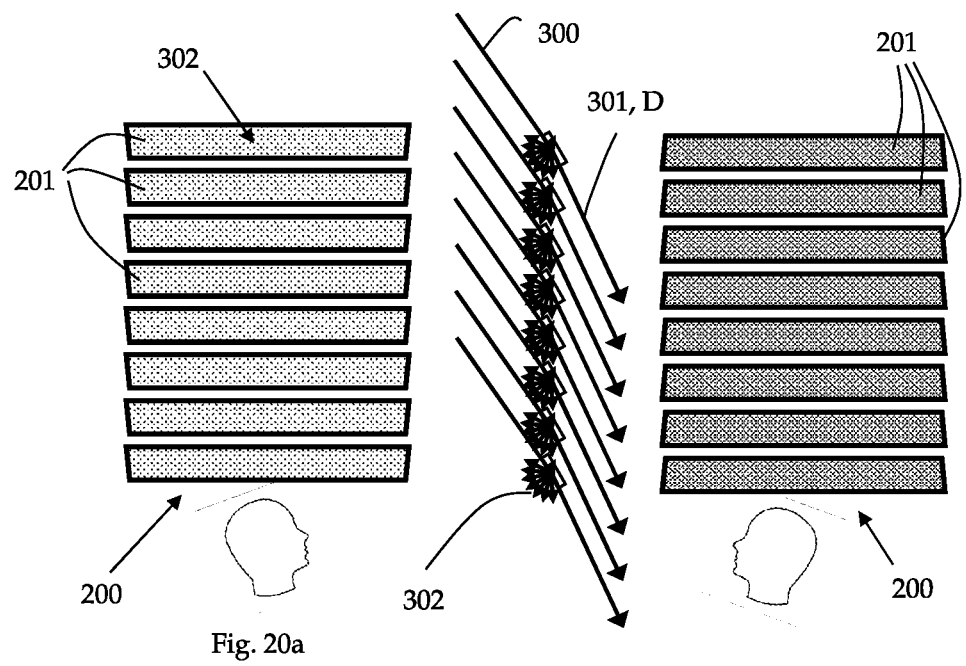

In particular, FIG. 20 illustrates the unit 200 with the lamellae 201 arranged according to a first inclination with respect to the sunlight 300 incident on them, such as to reflect it regularly downwards. A reflection of this type takes place, for example, when the lamellae 201 are inclined with respect to a horizontal reference plane, by an angle greater than the angle of incidence of sunlight on this horizontal plane. Under these conditions, the spectral portion 301 of sunlight reflected mainly in a regular manner is outside the visual field of an observer standing in front of the unit 200, regardless of which observation side he is on. In FIG. 20*a* the observation sides are illustrated schematically, showing on the left how the external side of the unit 200 appears to an observer placed in front of it and on the right how the internal side appears to an observer placed in front of it. With reference to the spectral portion of sunlight reflected mainly in a diffused manner 302, this is visible to an observer placed at the external side of the unit 200. Therefore, as represented in FIG. 20*a*, the external side of the unit 200 appears to have a uniform bluish colouring in the shade of a clear sky, due to the diffuse reflectance that is higher for wavelengths of the incident light comprised in the range of blue with respect to wavelengths of the incident light comprised in the range of red. For an observer placed on the internal side, the lamellae 201 appear on the contrary to be in the shade. The bluish colouring given by the higher diffuse reflectance for wavelengths comprised in the range of blue is therefore completely independent of the colouring assumed by the sky, in fact it can be reproduced even at night, if the unit is hit by a beam of artificial white light, for example the light projected by a street lamp or other dedicated lighting.

Figure 21:
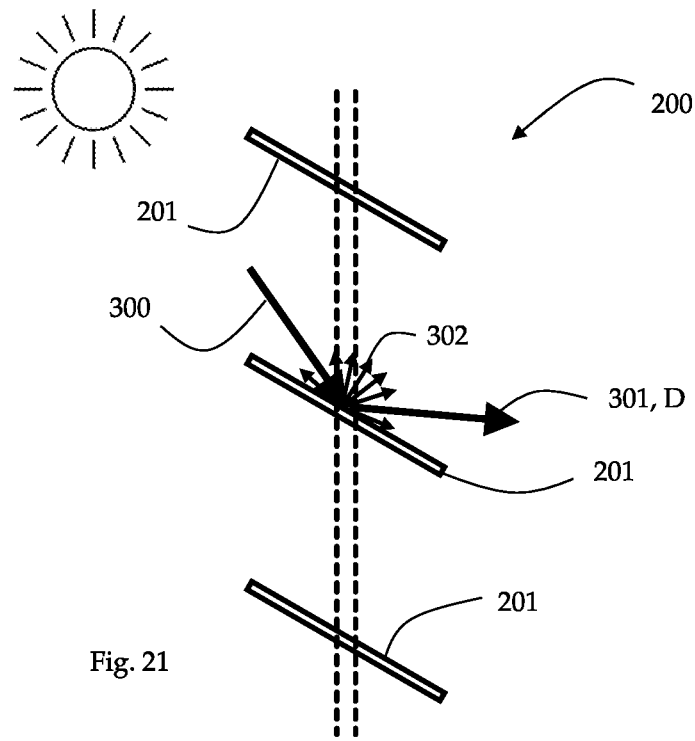
Figure 21A:
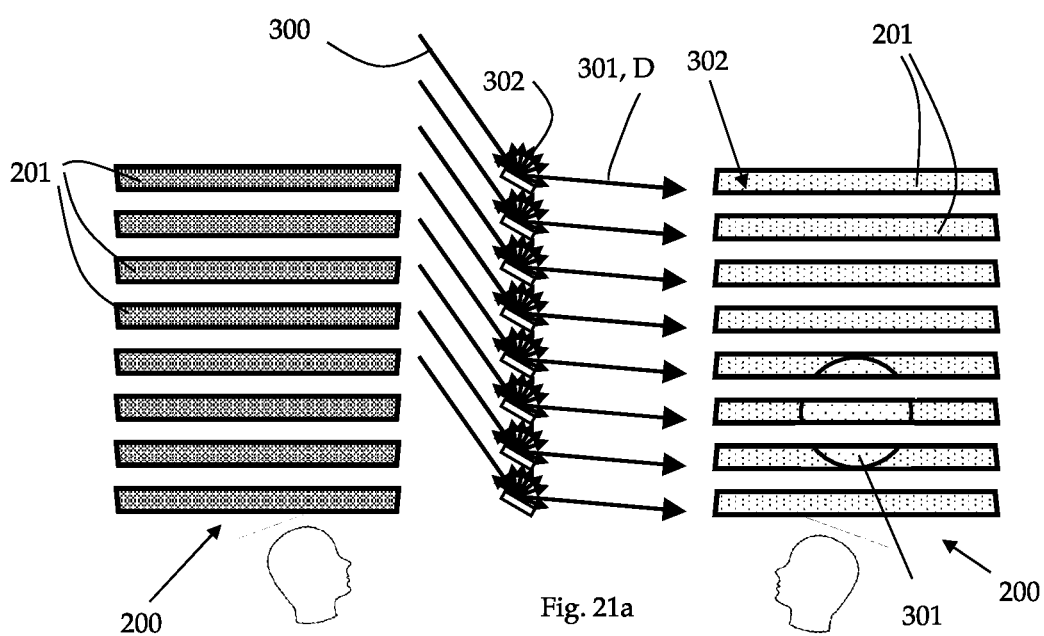

FIG. 21 illustrates the unit 200 with the lamellae 201 placed according to a different inclination with respect to the sunlight incident on them. In particular, the lamellae 201 of FIG. 21 are inclined in such a way as to reflect the incident sunlight 300 regularly inwards, in particular along a direction that is substantially parallel to the horizontal reference plane. Furthermore, the spectral portion of sunlight reflected in a diffused manner 302 is also visible to an observer placed at the internal side of the unit 200. Therefore, as schematised in FIG. 22*a*, the internal side of the unit 200 appears, to an observer placed on the internal side, with a bluish colouring determined by the diffused reflection 302 with a light spot created by the regular reflection 301, wherein the light spot is the reflected image of the sun. In other words, the appearance of the internal side of the unit 200 is a substantially faithful reproduction of a sunny sky. On the contrary, an observer placed on the external side of the unit 200 sees the lamellae 201 in the shade.

Figure 22:
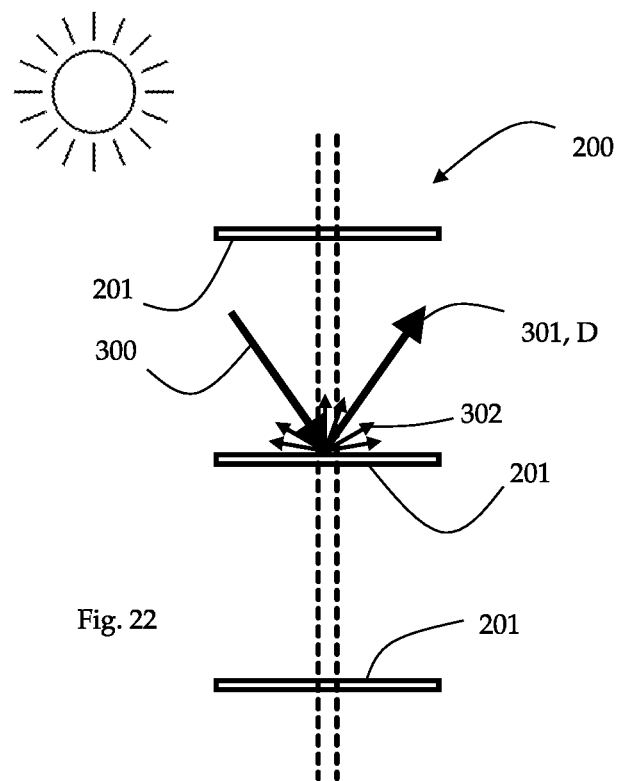
Figure 22A:
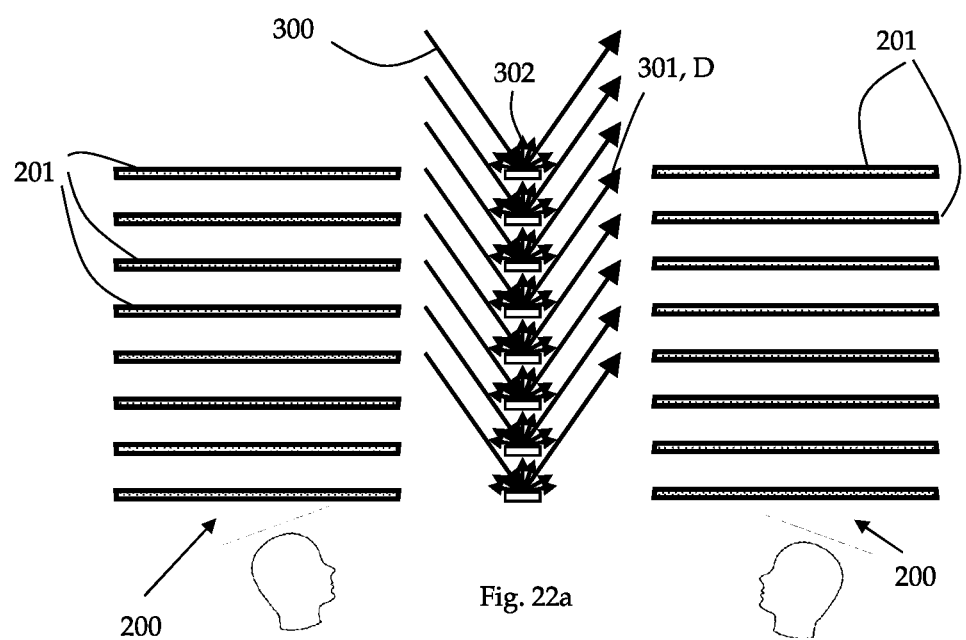

FIG. 22 illustrates the unit 200 with the lamellae 201 placed according to a third inclination with respect to the sunlight incident on them. In particular, the lamellae 201 of FIG. 22 are arranged parallel to the horizontal reference plane. In this configuration, both the spectral portion 301 of sunlight reflected mainly in a regular manner, and the spectral portion 302 of sunlight reflected mainly in a diffused manner are reflected upwards. As a result, only the thicknesses of the lamellae 201 are visible from both sides of observation without presenting particular chromatic effects, as represented schematically in FIG. 23*a*. However, inside a room delimited by the unit 200 it is possible to observe a bluish colouring effect in particular of the ceiling, in addition to a light spot representative of the reflected image of the sun. Inside the room, a typical outdoor colouring is thus reproduced, giving the environment the perception of large space.

Figure 23:
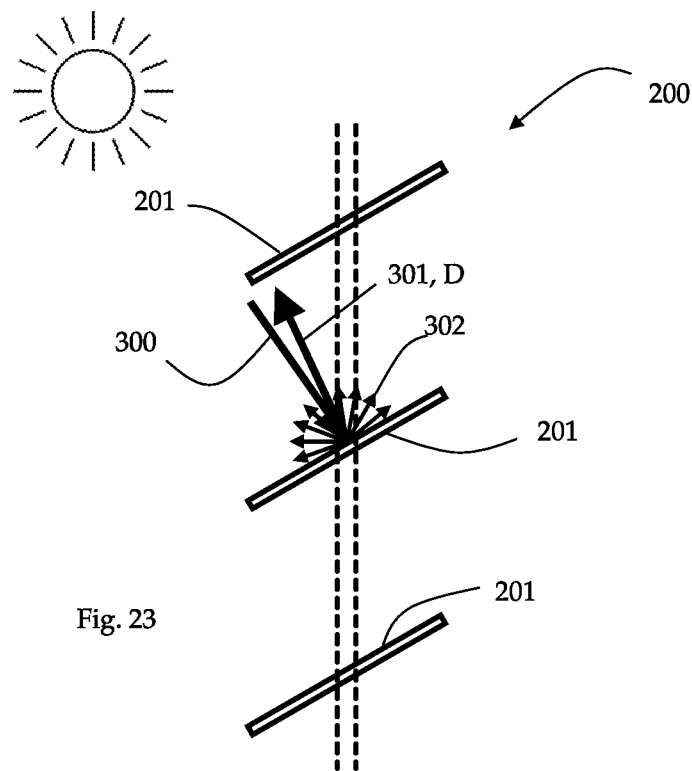
Figure 23A:
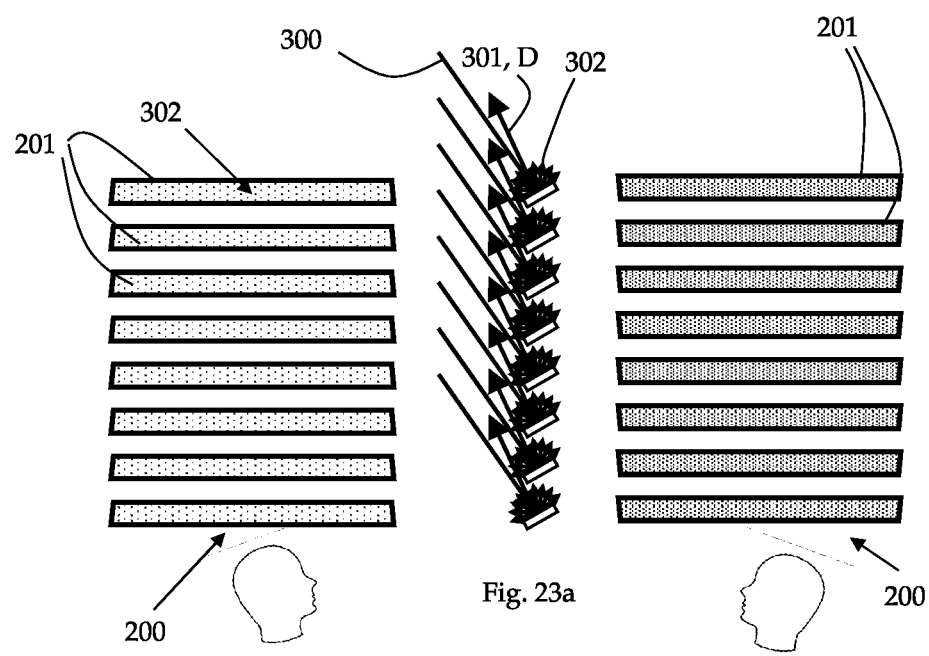

FIG. 23 illustrates the unit 200 with the lamellae 201 placed according to a fourth inclination with respect to the sunlight incident on them. In particular, the lamellae 201 of FIG. 23 are arranged with respect to the sunlight 300 in such a way as to reflect it regularly outwards and upwards. Similarly to the inclination represented in FIG. 20, also in this case the spectral portion 301 of sunlight reflected mainly in a regular manner is outside the visual field of an observer standing in front of the unit 200, regardless of which observation side he is on. While with reference to the spectral portion of sunlight reflected mainly in a diffused manner 302, this is visible to an observer placed at the external side of the unit 200. Therefore, as represented in FIG. 23a, the external side of the unit 200 appears to have a uniform bluish colouring in the shade of a clear sky (regardless of the momentary appearance assumed by the sky), due to the diffuse reflectance that is higher for wavelengths of the incident light comprised in the range of blue with respect to wavelengths of the incident light comprised in the range of red. For an observer placed on the internal side, the lamellae 201 appear on the contrary to be in the shade.

Figure 24:
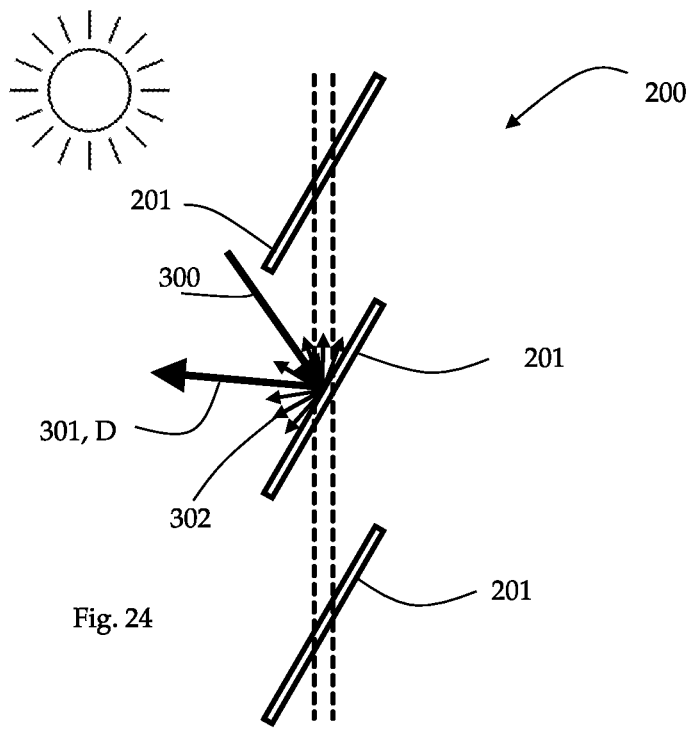
Figure 24A:
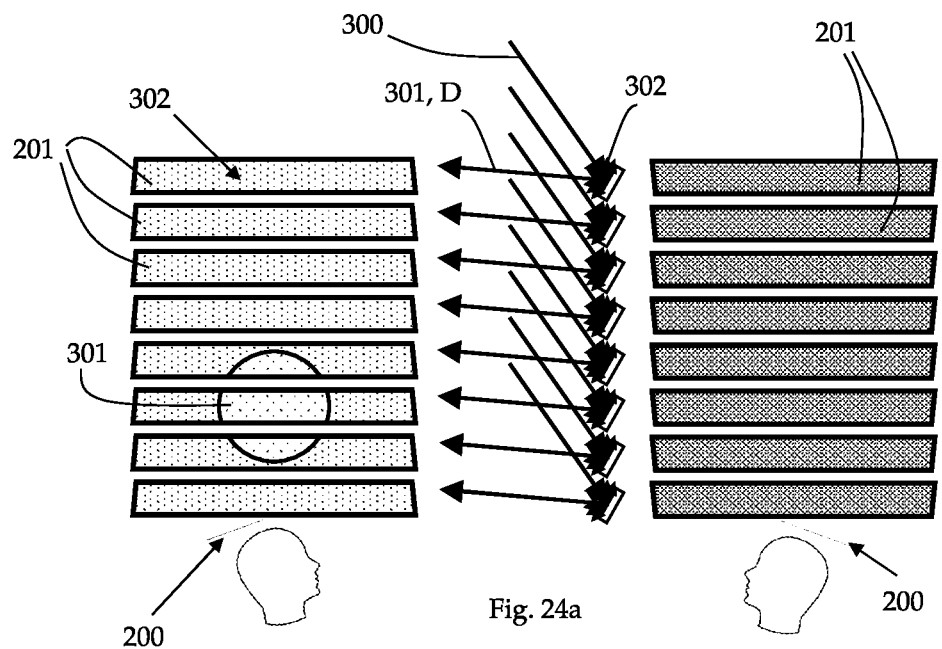

Finally, FIG. 24 illustrates the unit 200 with the lamellae 201 placed according to a fifth inclination with respect to the sunlight incident on them. In particular, the lamellae 201 of FIG. 24 are arranged in such a way as to reflect the incident sunlight 300 regularly outwards, in particular along a direction that is substantially parallel to the horizontal reference plane. Furthermore, the spectral portion of sunlight reflected in a diffused manner 302 is also visible to an observer placed at the external side of the unit 200. Therefore, as schematised in FIG. 24a, the external side of the unit 200 appears, to an observer placed on the external side, with a bluish colouring determined by the diffused reflection 302 with a light spot created by the regular reflection 301, wherein the light spot is the reflected image of the sun. In other words, the appearance of the internal side of the unit 200 is a substantially faithful reproduction of a sunny sky. On the contrary, an observer placed on the internal side of the unit 200 sees the lamellae 201 in the shade.

In the case of lamellae with variable chromatic diffusion, in addition to what is described above, it is possible to perceive a variation in the colouring assumed by the lamellae as a function of their inclination, as well as of the regularly reflected beam. The colouring of the lamellae, instead of remaining substantially light blue for all inclinations that allow the observer to see the light diffused by the chromatic diffusion layer 20, varies in colour as a function of the specific angle of inclination between the lamellae and the incident light, showing shades ranging from light blue to grey. In addition, as a function of the same angle of inclination between the lamellae and the incident light, the regularly reflected light beam varies in colour from shades of yellow to shades of red.

In the context of the present description and in the subsequent claims, "spectral portion of sunlight reflected mainly in a regular manner" means the spectral portion of sunlight locally reflected mainly in a regular manner, i.e. "locally" is referred substantially to each point or portion of the lamella 201. If the lamellae 201 have opposing faces that are completely flat or slightly curved, as in the cases represented by way of non-limiting example in FIGS. 3, 20-24, the spectral portion 301 of sunlight reflected mainly in a regular manner has substantially the same direction D for any point or portion of the lamella 201. In the general case in which the lamellae 201 have curved faces or with linear segments, such as the cases shown by way of non-limiting example in FIGS. 3a-3f, the spectral portion 301 of sunlight reflected mainly in a regular manner has a direction D which can vary for different points or portions of the lamella 201. In this case the properties associated with the presence of a reflected sunlight, for example the properties related to the presence of a reflected sunlight and a diffused sunlight, such as the chromatic properties of the light and/or the property of forming an image of the sky and sun, are to be understood as properties verified locally for each point or portion of the lamellae 201, or for an observer placed sufficiently close to the sunshade unit. In general, in the case of substantially flat lamellae, the direction D as described by way of example in FIGS. 20-24, i.e. the direction of the sunlight reflected mainly in a regular manner by the central portion of the lamella 201, is to be understood as the representative or main direction of the overall sunlight reflected in a regular manner by the lamella.

The invention claimed is:

1. A sunshade cladding unit comprising a plurality of lamellae each having a substantially flat and elongated conformation along a respective development axis (B), and a structure supporting the lamellae configured to support the plurality of lamellae in a condition of parallel and spaced apart lamellae along a direction orthogonal to the development axes (B), the structure supporting the lamellae being configured to support each of the plurality of lamellae in a rotatable manner about a rotation axis parallel to or coincident with its development axis (B), wherein each lamella of the plurality of lamellae includes at least one surface portion which comprises at least a reflective layer having at least one reflective surface, and a chromatic diffusion layer having a first surface proximal to the reflective surface and a second surface, opposite and substantially parallel to the first, configured to be illuminated by incident light, wherein the chromatic diffusion layer comprises a nano-pillar or nano-pore structure in a first material having a first refractive index (n1), immersed in a second material having a second refractive index (n2) different from the first (n1), in which the first and second materials are substantially non-absorbing or transparent to electromagnetic radiations with wavelength comprised in the visible spectrum, wherein a ratio ($n_M/n_m$) between a higher refractive index ($n_M$) and a lower refractive index ($n_m$) chosen between the first (n1) and the second (n2) refractive indexes is between 1.05 and 3, wherein the nano-pillars or nano-pores locally have a development along a main direction not parallel to the first surface and to the second surface of the chromatic diffusion layer, and the nano-pillar or nano-pore structure is characterized by a plurality of geometric parameters comprising a pillar diameter or pore diameter ($d_p$), a pillar length or pore length ($l_p$) along said non-parallel direction, a surface density of nano-pillars or nano-pores ($D_p$) and a porosity ($P_p$) of the nano-pillar or nano-pore structure, and wherein the plurality of geometric parameters is configured to provide a higher regular reflectance for wavelengths of the incident light in the range of red with respect to wavelengths of the incident light in the range of blue and a higher diffuse reflectance for wavelengths of the incident light in the range of blue with respect to wavelengths of the incident light in the range of red.

2. The unit according to claim 1,
in which the development along the main direction of the nano-pillars or nano-pores is characterized by a directional order parameter between 0.7 and 1, calculated as:

$$S=2\langle\cos^2\vartheta\rangle-1, \quad (1)$$

wherein $\vartheta$ is the flat angle between the main development direction identified in a section plane transverse to the first surface and to the second surface of the chromatic diffusion layer, and an axis associable with each nano-pillar or nano-pore of a plurality of nano-pillars or nano-pores lying in the section plane; and/or wherein the nano-pillars or the nano-pores have a distribution with respect to the first surface and to the second surface of the chromatic diffusion layer divided into coherence areas extending less than 100 μm², wherein each nano-pillar or nano-pore within one of these coherence areas is substantially equidistant from adjacent nano-pillars or adjacent nano-pores, within the same coherence area.

3. The unit according to claim 1, wherein the diameter ($d_p$) is between 40 nm and 300 nm.

4. The unit according to claim 1, wherein the length along the main direction of the nano-pillars or nano-pores is between 300 nm and 200 μm (300 nm<$I_p$<200 μm).

5. The unit according to claim 1, wherein the surface density ($D_p$) is such as to define an inter-pore or inter-pillar distance ($I_p$) less than 2.8 times the diameter ($d_p$).

6. The unit according to claim 1, wherein the porosity ($P_p$) of the nano-pillar or nano-pore structure between 20% and 80%.

7. The unit according to claim 1, wherein the diameter ($d_p$) is greater than a diameter threshold value ($d_{p\_threshold}$) and/or the length ($I_p$) is greater than a length threshold value ($I_{p\_threshold}$) such as to provide a variability in the correlated color temperature of a luminous flux reflected by the at least one surface portion of the lamella by regular reflection, as a function of an angle of incidence of a corresponding luminous flux incident on the at least one surface portion of the lamella with a wavelength between 380 nm and 740 nm.

8. The unit according to claim 7,
wherein the threshold diameter value ($d_{p\_threshold}$) is between 50 nm and 120 nm; and/or
wherein the length threshold value ($I_{p\_threshold}$) is between 500 nm and 5 μ.

9. The unit according to claim 1,
wherein the first material is a metal oxide; and/or
wherein the second material is selected from air, a polymer, a resin, a silicone, a different oxide, said second material being at least partially non-absorbent, or transparent at least to electromagnetic radiations with wavelength in the visible light spectrum and having a refractive index between 1.3 and 1.55.

10. The unit according to claim 1, wherein the at least one surface portion of the lamella coincides with
at least one first face of the lamella,
a pair of opposing faces of the lamella or
a set of faces defining the lamella.

11. The unit according to claim 1, wherein the rotation axis of the lamellae is a vertical axis or a horizontal axis.

12. The unit according to claim 1, wherein each lamella of the plurality of lamellae comprises a single sheet.

13. The unit according to claim 12, wherein the sheet is curved.

14. The unit according to claim 12, wherein the sheet ends with a reinforcement or folding at the ends along the sides parallel to the development axis, and/or
wherein the sheet ends with a closure at the ends that are orthogonal to the development axis (B).

15. The unit according to claim 1, wherein each lamella of the plurality of lamellae comprises a pair of sheets facing each other so as to define a lamella section defining a closed line, and/or
wherein each lamella of the plurality of lamellae has a hollow tubular conformation, and/or
wherein each lamella of the plurality of lamellae has opposing sides defined by curved stretches and/or linear segments.

16. The unit according to claim 1, wherein the rotation axis of each lamella of the plurality of lamellae coincides with an axis of centre of gravity of the lamella or is offset with respect to the same.

17. The unit according to claim 1, further comprising at least one protection panel at least partially transparent to light, and configured to define a hollow chamber for housing the plurality of lamellae.

18. The unit according to claim 1, further comprising a pair of protection panels arranged parallel to each other and defining between them a hollow chamber configured to house the plurality of lamellae.

19. The unit according to claim 17, wherein the housing hollow chamber is a closed hollow chamber.

20. The unit according to claim 17, wherein the housing hollow chamber is an open hollow chamber.

21. The unit according to claim 1, wherein the lamellae of the plurality of lamellae have a width between 1 cm and 14 cm; or
wherein the lamellae of the plurality of lamellae have a width between 1 cm and 90 cm.

* * * * *